United States Patent
Gupta et al.

(10) Patent No.: US 12,437,261 B2
(45) Date of Patent: Oct. 7, 2025

(54) AUTOMATED ORDER CONSOLIDATION AND PACKAGING MECHANISM

(71) Applicant: Grey Orange Inc., Roswell, GA (US)

(72) Inventors: Pareiya Gupta, Haryana (IN); Gnanaprakash Muthusamy, Haryana (IN); Gaurav Kejriwal, Uttar Pradesh (IN); Yashant Taneja, Haryana (IN)

(73) Assignee: Grey Orange Inc., Roswell, GA (US)

( * ) Notice: Subject to any disclaimer, the term of this patent is extended or adjusted under 35 U.S.C. 154(b) by 307 days.

(21) Appl. No.: 18/067,210

(22) Filed: Dec. 16, 2022

(65) Prior Publication Data

US 2023/0196280 A1 Jun. 22, 2023

(30) Foreign Application Priority Data

Dec. 16, 2021 (IN) .............................. 202141058824

(51) Int. Cl.
*G06Q 10/087* (2023.01)
*G06Q 10/10* (2023.01)

(52) U.S. Cl.
CPC .................................. *G06Q 10/087* (2013.01)

(58) Field of Classification Search
CPC ...................................................... G06Q 10/087
See application file for complete search history.

(56) References Cited

U.S. PATENT DOCUMENTS

| | | | |
|---|---|---|---|
| 2020/0265380 A1* | 8/2020 | Dubois | G06Q 10/0838 |
| 2023/0096624 A1* | 3/2023 | Sharma | G06Q 10/087 |
| | | | 700/218 |
| 2023/0106638 A1* | 4/2023 | Wang | H04N 19/188 |
| | | | 375/240.26 |
| 2023/0348190 A1* | 11/2023 | Roth | G06Q 30/0601 |

* cited by examiner

*Primary Examiner* — Garcia Ade
(74) *Attorney, Agent, or Firm* — Oblon, McClelland, Maier &Neustadt, L.L.P.

(57) ABSTRACT

An order consolidation system and method in a storage facility is disclosed. An item received at an order consolidation station by way of a robotic apparatus is transferred by the order consolidation station to another robotic apparatus by way of instructions received from a control server. The control server detects a side of the order consolidation station at which the robotic apparatus arrives, compares received data of placed items on the order consolidation station with stored data to determine a match between the received data and the stored data, and controls the transfer based on the match between the received data and the stored data and detection of the robotic apparatus at the other side of the order consolidation station. The transport of the robotic apparatus with the items to a packaging station is further controlled by the control server for packaging an order.

20 Claims, 16 Drawing Sheets

the contents of which are
AUTOMATED ORDER CONSOLIDATION AND PACKAGING MECHANISM

CROSS-REFERENCE TO RELATED APPLICATIONS/INCORPORATION BY REFERENCE

This patent application makes reference to, claims priority to, and claims the benefit of Indian provisional application 202141058824 filed Dec. 16, 2021, the contents of which are hereby incorporated herein by reference in its entirety.

FIELD

Various embodiments of the disclosure relate generally to storage facilities, and more particularly to a system for order consolidation and packaging.

BACKGROUND

The advent of e-commerce has led to the widespread use of storage facilities for storing items and handling a large volume of orders. Such storage facilities typically include human operators that perform consolidation and packaging of orders. In a scenario, to consolidate and package a single order, a human operator collects all items belonging to the order and places the collected items in a tote. The collected items are further packaged by another human operator. Considering the high volumes of orders, such human touchpoints in order consolidation and packaging leads to decrease in the efficiency and throughput of order consolidation and packaging operations and increases the likelihood of human error.

In light of the foregoing, there exists a need for a technical solution that solves the abovementioned problems by increasing the efficiency of consolidation and packaging.

Limitations and disadvantages of conventional and traditional approaches will become apparent to one of skill in the art, through comparison of described systems with some aspects of the present disclosure, as set forth in the remainder of the present application and with reference to the drawings.

SUMMARY

In an embodiment, an order consolidation system is provided. The order consolidation system comprises a first robotic apparatus, a second robotic apparatus, a third robotic apparatus, an order consolidation station, and a control server. The order consolidation station is equipped with a plurality of order consolidation sections. A first order consolidation section of the plurality of order consolidation sections comprises a plurality of rollers. The control server is configured to estimate a first threshold distance from a first side and a second threshold distance from a second side of the first order consolidation section, detect that the first robotic apparatus and the second robotic apparatus have arrived at the first side of the order consolidation station and are within the first threshold distance of the first order consolidation section. The control server is configured to receive item data associated with at least one of the first item and the second item to determine a match between the received item data of the first item and the second item and stored item data associated with the first item and the second item based on the detection that the first robotic apparatus and the second robotic apparatus have arrived at the first side and are within the first threshold distance of the first order consolidation section, and a placement of at least one of the first item and the second item on the first order consolidation section, respectively. The control server is further configured to activate, the plurality of rollers, based on the match between the received item data and the stored item data of each of the first item and the second item, and detect that the third robotic apparatus has arrived at the second side and is within a second threshold distance of the first order consolidation section. The control server is further configured to control a transfer, by way of the activated plurality of rollers, the first item and the second item to the third robotic apparatus based on the detection that the third robotic apparatus has arrived at the second side and is within the second threshold distance, and control the third robotic apparatus to transport the first item and the second item for packaging a first order that includes the first item and the second item.

In some embodiments, the received item data and the stored item data associated with the first item and the second item includes at least one of a weight, a size, dimensions, and a type of the first item and the second item, respectively.

In some embodiments, the first item and the second item are transferred in a tote that is placed on the plurality of rollers. The tote having the first item and the second item is transported for packaging the first order.

In some embodiments, the order consolidation system is in a storage facility. The control server is further configured to identify a first path of the first robotic apparatus and a second path of the second robotic apparatus to arrive at a first location and a second location of the storage facility, respectively, and communicate the first path to the first robotic apparatus and the second path to the second robotic apparatus to control an arrival of the first robotic apparatus at the first location and the second robotic apparatus at the second location. The first item is placed on the first robotic apparatus based on the arrival of the first robotic apparatus at the first location and the second item is placed on the second robotic apparatus based on the arrival of the second robotic apparatus at the second location. The control server is further configured to identify a third path of the first robotic apparatus and a fourth path of the second robotic apparatus to control arrival of the first robotic apparatus and the second robotic apparatus at the first side, respectively.

In some embodiments, the control server is further configured to control the third robotic apparatus to unload the first item and the second item to an inbound conveying mechanism at a packaging station of the storage facility.

In some embodiments, the control server is further configured to estimate a first time period for the arrival of the first robotic apparatus at the first side of the first order consolidation section, a second time period for the second robotic apparatus to arrive at the first side of the order consolidation station, and a third time period for the third robotic apparatus to arrive at the second side of the first order consolidation section to detect the arrival of the first robotic apparatus within the first time period, the second robotic apparatus within the second time period, and the third robotic apparatus within the third time period, respectively. The control server is further configured to generate a first notification for the order consolidation station based on the detection of at least one of non-arrival of the first robotic apparatus and the second robotic apparatus at the first side and the third robotic apparatus at the second side.

In some embodiments, the control server is further configured to determine whether the first robotic apparatus and the second robotic apparatus simultaneously arrive at the first side of the first order consolidation section and queue the second robotic apparatus after the first robotic apparatus based on the determination that the first robotic apparatus and the second robotic apparatus simultaneously arrive at the order consolidation station.

In some embodiments, the control server is further configured to deactivate the plurality of rollers when the first item and the second item are transferred to the third robotic apparatus.

In some embodiments, the control server is further configured to rotate the plurality of rollers in an anti-clockwise direction or a clockwise direction.

In some embodiments, a number of rollers in each order consolidation section of the order consolidation station is same or different.

In some embodiments, the order consolidation station is equipped with a plurality of sensors.

In some embodiments, the control server is further configured to receive first sensor data from the plurality of sensors. Based on the first sensor data, the control server determines that the first robotic apparatus and the second robotic apparatus have arrived at the first side and are within the first threshold distance of the first order consolidation section, and the third robotic apparatus has arrived at the second side and is within the second threshold distance of the first order consolidation section.

In some embodiments, the received item data includes first received data and second received data associated with the first item and the second item, respectively, and the stored item data includes first stored data and second stored data associated with the first item and the second item, respectively.

In some embodiments, the control server is further configured to retrieve from a memory associated with the control server, based on the item data received from the plurality of sensors, at least one of the first stored data and the second stored data and compare at least one of (i) the first stored data with the first received data, and (ii) the second stored data with the second received data to determine the match, respectively.

In some embodiments, the control server is further configured to identify that a height of the order consolidation station mismatches a height of at least one of the first robotic apparatus and the second robotic apparatus and activate, based on the identification of mismatch of the height of (i) at least one of the first robotic apparatus, the second robotic apparatus, and the third robotic apparatus and (ii) the order consolidation station, a roll-up and roll-down mechanism of the order consolidation station to at least one of (i) receive the first item from the first robotic apparatus, (ii) receive the second item from the second robotic apparatus, and (iii) control the transfer of the first item and the second item to the third robotic apparatus, respectively.

In some embodiments, each order consolidation section is separated from other order consolidation sections of the plurality of order consolidation sections by a partition.

In some embodiments, the control server is further configured to detect an operational failure of the first order consolidation section and re-route the first robotic apparatus, the second robotic apparatus, and the third robotic apparatus to another order consolidation section of the order consolidation station.

In another embodiment, an order consolidation method is provided. The method comprises estimating, by a control server, a first threshold distance from a first side of a first order consolidation section of an order consolidation station and a second threshold distance from a second side of the first order consolidation section, detecting, by the control server, that a first robotic apparatus and a second robotic apparatus have arrived at the first side of the first order consolidation section and are within the first threshold distance of the first order consolidation section, and receiving, by the control server, based on the detection that the first robotic apparatus and the second robotic apparatus have arrived at the first side and are within the first threshold distance of the first order consolidation section, item data associated with at least one of the first item and the second item based on a placement of at least one of a first item and a second item on the first order consolidation section. The method further comprises determining a match between the received item data of the first item and the second item and stored item data associated with the first item and the second item, respectively. The method further comprises activating, by the control server, a plurality of rollers of the order consolidation station, based on the match between the received item data and the stored item data of each of the first item and the second item, and detecting, by the control server, that a third robotic apparatus has arrived at the second side of the order consolidation station and is within the second threshold distance of the first order consolidation section. The method further comprises controlling a transfer, by the control server by way of the activated plurality of rollers, the first item and the second item to the third robotic apparatus based on the detection that the third robotic apparatus has arrived at the second side and is within the second threshold distance, and controlling, by the control server, the third robotic apparatus to transport the first item and the second item for packaging a first order that includes the first item and the second item.

In some embodiments, the order consolidation method comprises identifying, by the control server, that a height of the order consolidation station mismatches a height of at least one of the first robotic apparatus and the second robotic apparatus, and activating, by the control server, based on the identification of mismatch of the height of (i) at least one of the first robotic apparatus, the second robotic apparatus, and the third robotic apparatus and (ii) the order consolidation station, a roll-up and roll-down mechanism of the order consolidation station.

In some embodiments, the order consolidation method further comprises determining, by the control server, whether the first robotic apparatus and the second robotic apparatus simultaneously arrive at the first side of the first order consolidation section and queuing, by the control server, the second robotic apparatus after the first robotic apparatus based on the determination that the first robotic apparatus and the second robotic apparatus simultaneously arrive at the order consolidation station.

Embodiments of the present disclosure provide a control server that controls order consolidation at an order consolidation station that is equipped with multiple order consolidation sections. Each order consolidation section includes a plurality of rollers that form a conveying mechanism for a corresponding order consolidation section. The plurality of rollers of each order consolidation section are operable independently of the plurality of rollers of other order consolidation sections. The order consolidation station is configured to receive items from a set of robotic apparatus that may arrive from at least one of a Goods-To-Person (GTP) station, a Totes-to-Person (TTP) station, or a manual operating station. Each robotic apparatus from the set of robotic apparatus may thus arrive at a corresponding order consolidation section of the order consolidation station based on instructions received from the control server. The control server detects arrival of the robotic apparatus at a first side of the order consolidation station and presence of the robotic apparatus within a threshold distance of a selected order consolidation section. The control server further receives item data associated with the placed item on the order consolidation station to determine a match between the received item data and stored item data. The plurality of rollers are activated, based on a match between the received item data and the stored item data. The arrival of another robotic apparatus at a second side of the order consolidation station and within a second threshold distance of the selected order consolidation section is further detected by the control server. The item is transferred to the robotic apparatus at the second side by activating the plurality of rollers, and the robotic apparatus is controlled to transport all the items at the same time for packaging an order. The items may be transferred by way of totes to the packaging station. When the items are collected from the tote, the empty tote may be again used for order consolidation, thereby auto-replenishing the totes for order consolidation. In addition, the different sections of the order consolidation station are mapped to different orders thereby consolidating multiple orders at the same time. Due to the automatic consolidation occurring at the order consolidation station, a speed of consolidation and precision is improved as compared to prior-art techniques for consolidation.

These and other features and advantages of the present disclosure may be appreciated from a review of the following detailed description of the present disclosure, along with the accompanying figures in which like reference numerals refer to like parts throughout.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Figure 1A:
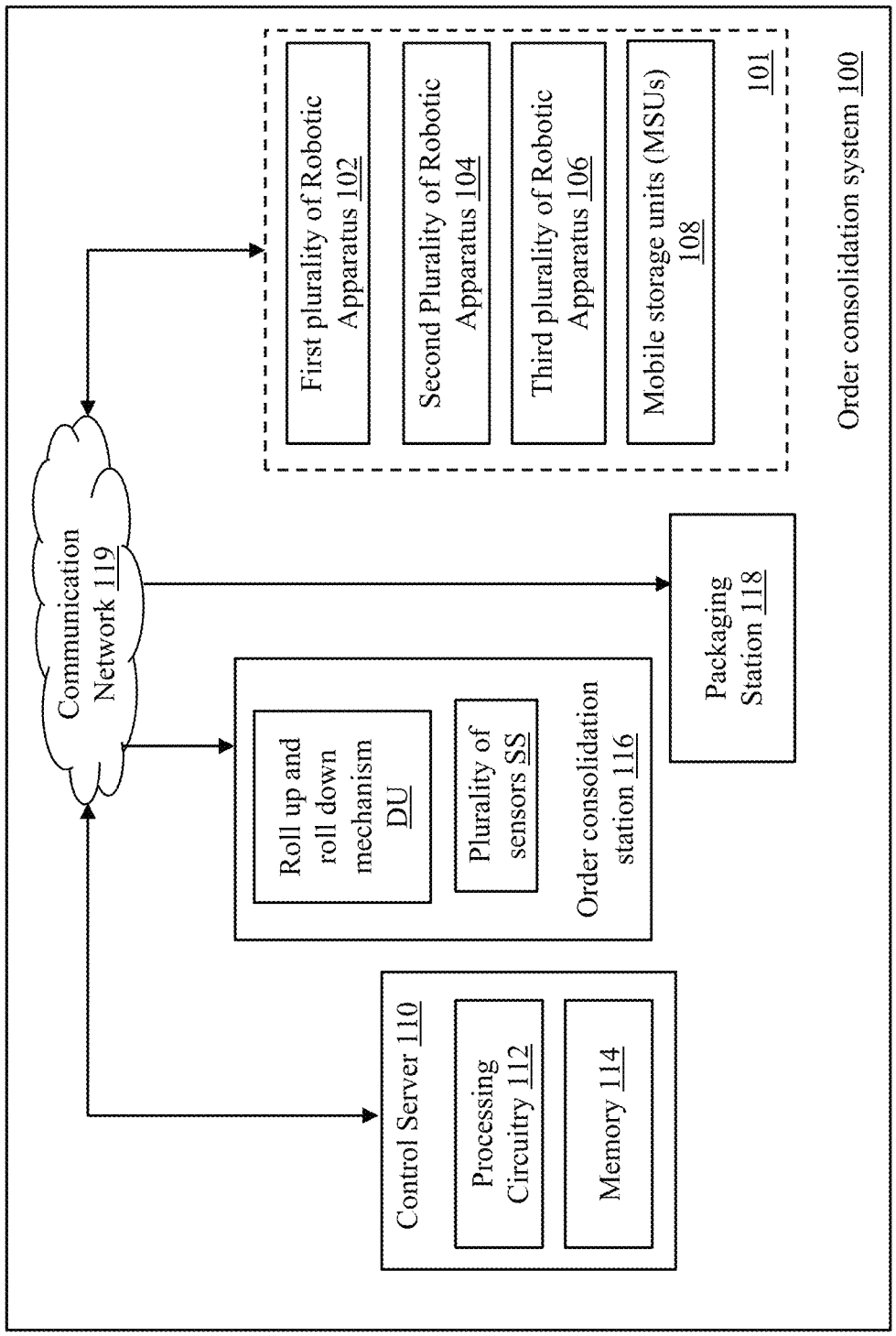
FIG. 1A is a block diagram that illustrates an order consolidation system in a storage facility, in accordance with an exemplary embodiment of the present disclosure.
Figure 1C:
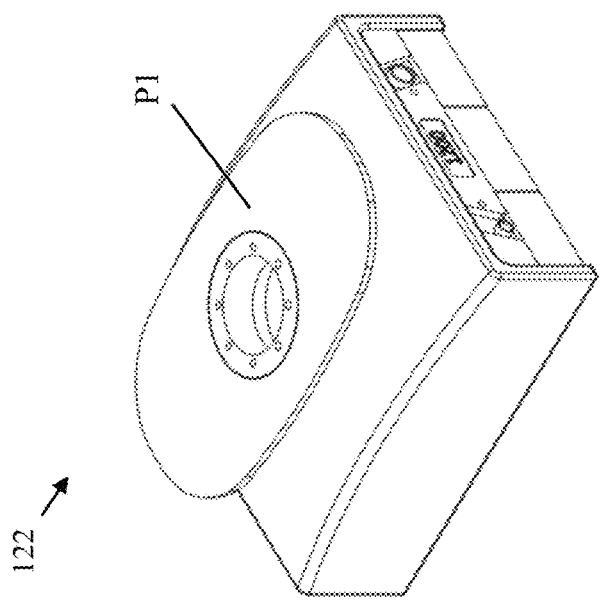
FIGS. 1B, 1C, and 1D are diagrams that illustrate exemplary robotic apparatus of the order consolidation system of FIG. 1A, in accordance with an embodiment of the present disclosure.
Figure 1B:
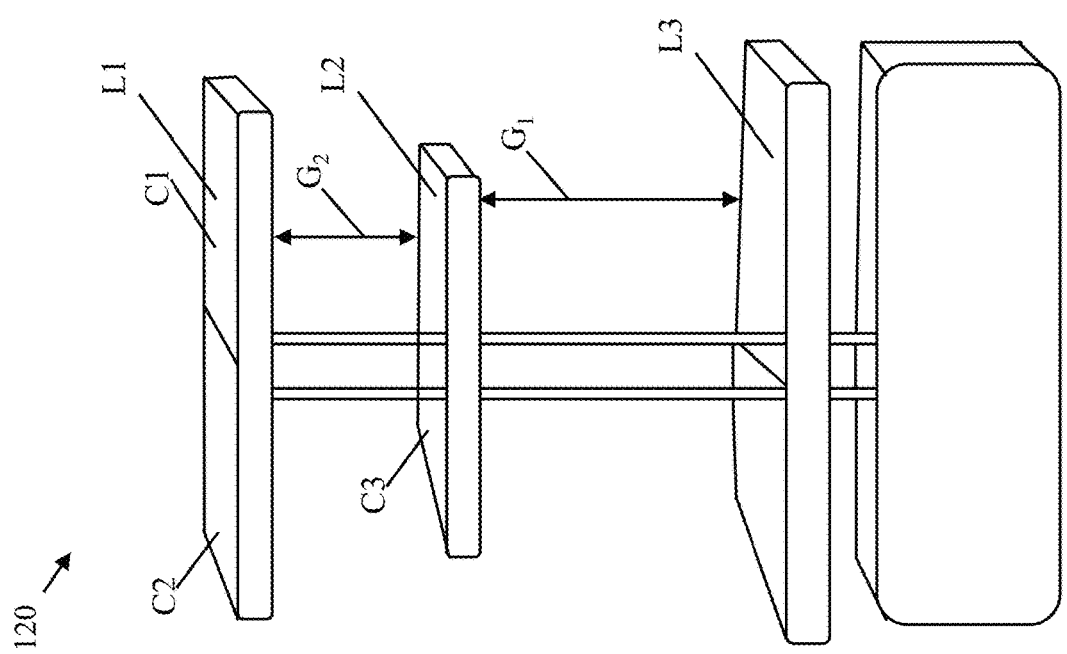
Figure 1D:
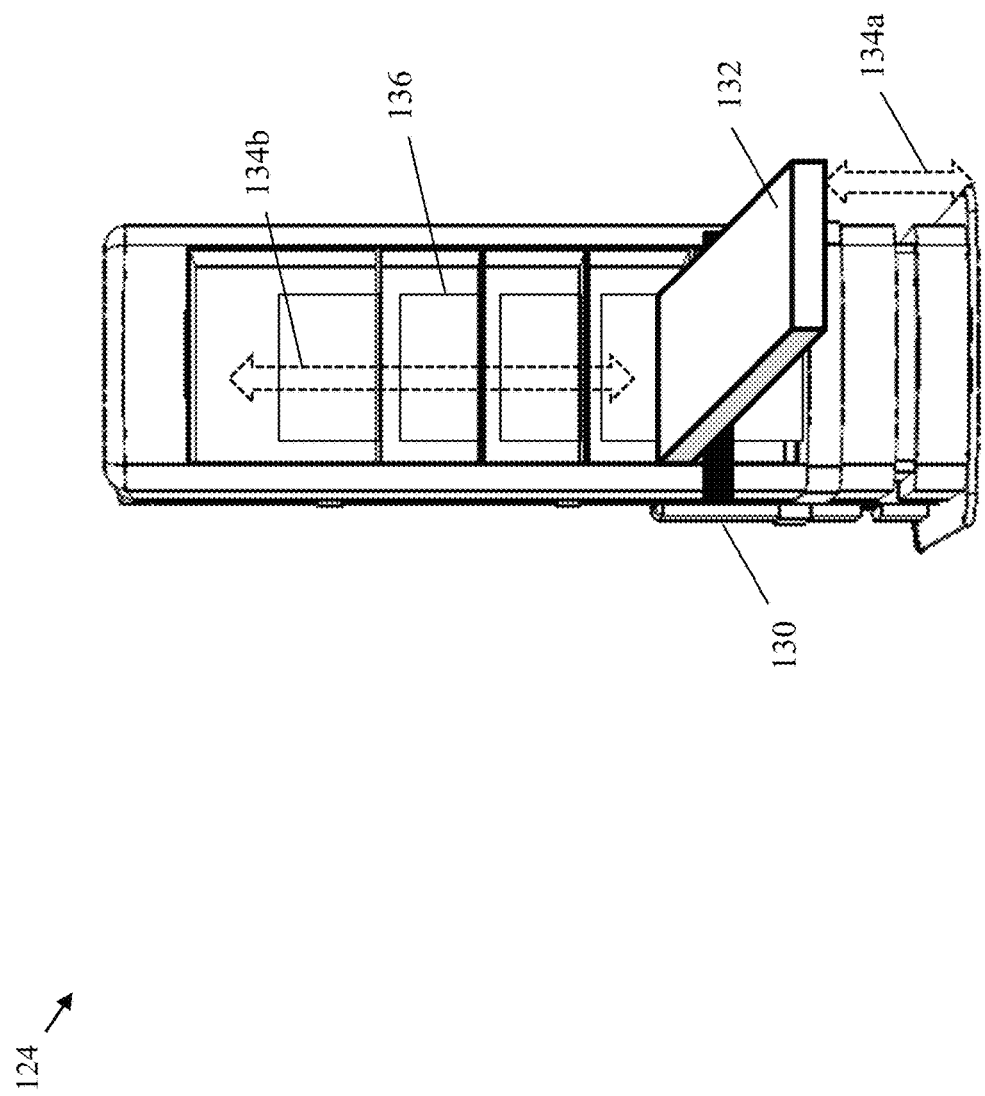

FIG. 1A is a diagram that illustrates an order consolidation system 100 in a storage facility in accordance with an exemplary embodiment of the disclosure. FIGS. 1B, 1C, and 1D are diagrams that illustrate exemplary robotic apparatus 101 of the order consolidation system 100 of FIG. 1A, in accordance with an embodiment of the present disclosure. The order consolidation system 100 is implemented using the robotic apparatus 101 such as a first plurality of robotic apparatus 102, a second plurality of robotic apparatus 104, a third plurality of robotic apparatus 106, mobile storage units (MSUs) 108, a control server 110 that includes processing circuitry 112 and a memory 114, an order consolidation station 116, a packaging station 118, and a communication network 119. The first plurality of robotic apparatus 102, the second plurality of robotic apparatus 104, the third plurality of robotic apparatus 106, the MSUs 108, the order consolidation station 116, and the packaging station 118 are controlled by way of the control server 110. The storage facility is further divided into multiple areas such as an order consolidation area 500 (shown in FIG. 5) that houses the order consolidation station 116 and a packaging area that houses the packaging station 118. The control server 110 may communicate with the first plurality of robotic apparatus 102, the second plurality of robotic apparatus 104, the third plurality of robotic apparatus 106, the MSUs 108, the order consolidation station 116, and the packaging station 118 by way of the communication network 119 or through separate communication networks established therebetween.

Examples of the storage facility may include, but are not limited to, a forward storage facility, a backward storage facility, a fulfillment center, a manufacturing center, or a retail store (e.g., a supermarket, an apparel store, or the like). One of the first plurality of robotic apparatus 102, the second plurality of robotic apparatus 104, and the third plurality of robotic apparatus 106 are described in conjunction with FIGS. 1B-1D, respectively. For the sake of brevity, the second plurality of robotic apparatus 104 include those robotic apparatus that transfer the MSUs 108 within the storage facility. Further, the first plurality of robotic apparatus 102 include those robotic apparatus that transports received items or totes from one station to another station.

Figure 2:
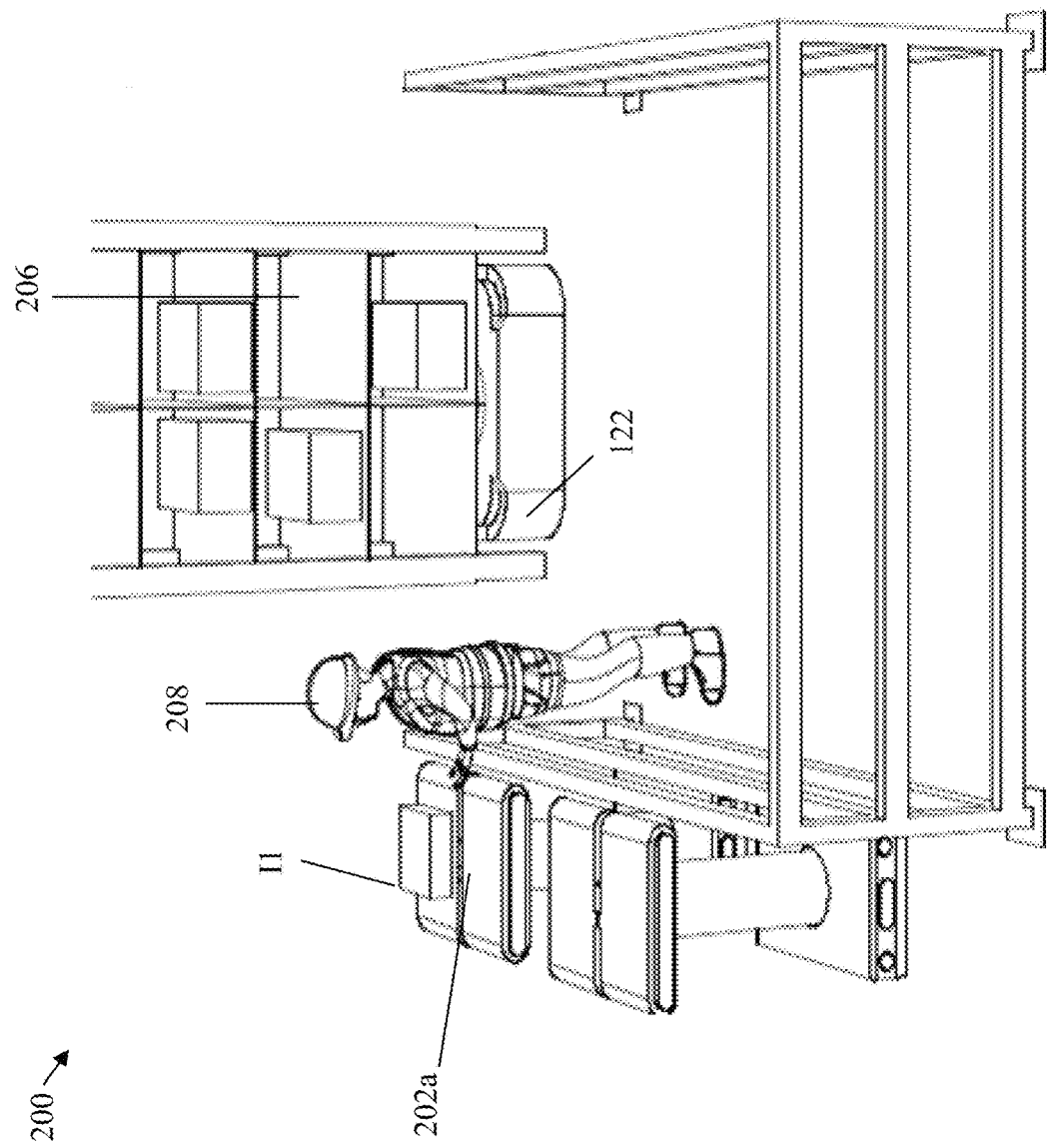
FIG. 2 is a diagram that illustrates an exemplary environment of a Goods-To-Person (GTP) implementation in the storage facility of FIG. 1A, in accordance with an exemplary embodiment of the disclosure.
Figure 3:
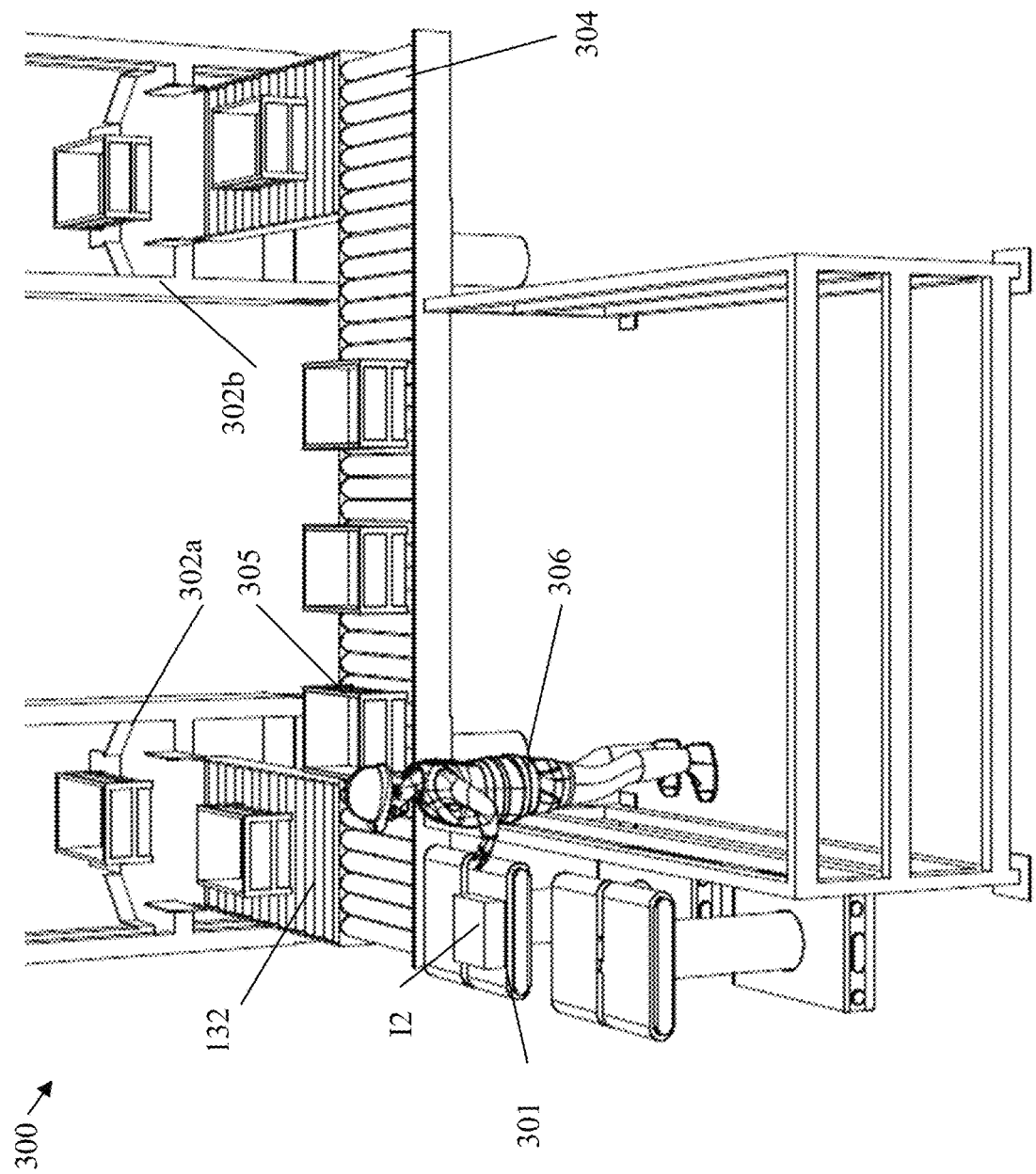
FIG. 3 is a diagram that illustrates an exemplary environment of a Totes-To-Person (TTP) implementation in the storage facility of FIG. 1A, in accordance with an exemplary embodiment of the disclosure.
Figure 4:
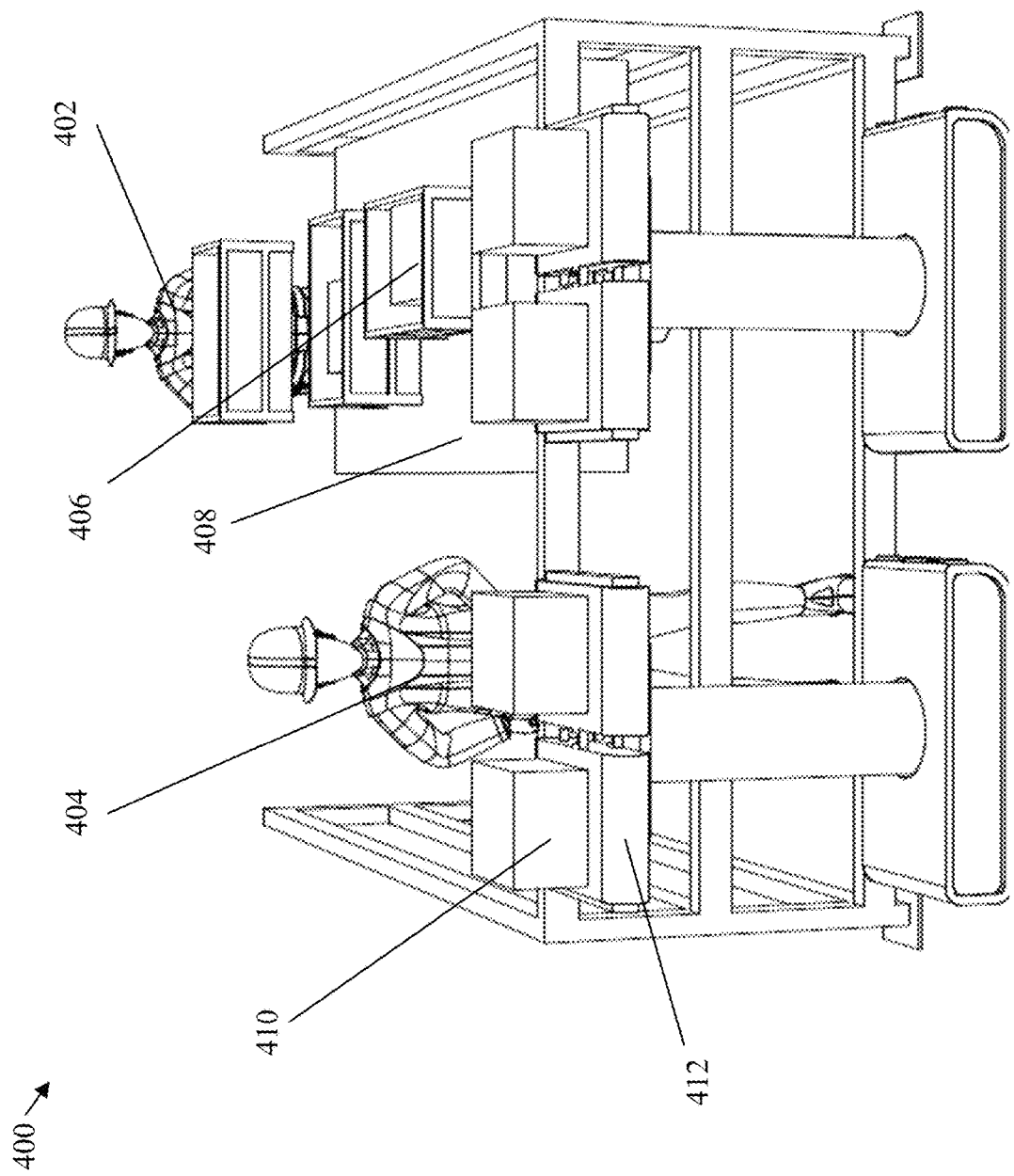
FIG. 4 is a diagram that illustrates an exemplary environment of a manual operating station implementation in the storage facility of FIG. 1A, in accordance with an exemplary embodiment of the disclosure.

Referring now to FIG. 1B, a first robotic apparatus 120 of the first plurality of robotic apparatus 102 is shown, in accordance with an exemplary embodiment of the disclosure. The first robotic apparatus 120 may be configured to perform various operations under the control of the control server 110. The first robotic apparatus 120 may include suitable circuitry, logic, instructions, interfaces, and/or codes executable by the circuitry, for automatically transporting inventory items (hereinafter referred to as "items") or totes in the storage facility based on commands received from the control server 110. The control server 110 thus determines a path for the first robotic apparatus 120 to travel in the storage facility, items to be picked up, transported, and unloaded by the first robotic apparatus 120, and the like. The first robotic apparatus 120 may be further configured to collect one or more units of items from at least one of a Goods-To-Person (GTP) system 200 (as shown in FIG. 2), a Totes-To-Person (TTP) system 300 (as shown in FIG. 3), and a manual operating station 400 (as shown in FIG. 4) and transport received units of the items to another station in the storage facility for order consolidation and packaging. It will be apparent to those skilled in the art that the first robotic apparatus 120 may be configured to perform any peripheral task without deviating from the scope of the disclosure.

The first robotic apparatus 120 may be equipped with various sensors such as motion sensors, pressure sensors, radio frequency identification (RFID) sensors, and/or the like for determining a relative position within the storage facility and/or identifying a desired location in the storage facility. Each sensor of the first robotic apparatus 120 is controlled by the control server 110 to sense at least one of motion, pressure, position, or the like of the first robotic apparatus 120. Examples of the first robotic apparatus 120 may include robotic devices, for example, autonomous mobile robots (AMRs), autonomous guided vehicles (AGVs), or a combination thereof. The first robotic apparatus 120 may include one or more levels having identical or different dimensions (for example, length and breadth). For example, the first robotic apparatus 120 is shown to include three levels L1, L2, and L3 having different dimensions. Hence, items of suitable sizes may be placed on each of the levels L1, L2, and L3. Further, each of the levels L1, L2, and L3 includes at least one conveyor that may receive the item to be carried and transferred to a desired location. As shown, the level L1 may include a first conveyor C1 and a second conveyor C2. A movement of the first conveyor C1 and the second conveyor C2 may be mutually independent. Further, the level L2 may include a single conveyor C3. Moreover, a gap between the two levels may be varying. As shown, a first gap $G_1$ between the levels L2 and L3 may be greater than a second gap $G_2$ between the level L2 and the level L1. Hence, an item to be kept on the level L3 may have a dimension larger than another item being kept on the level L2. A top level (i.e., the level L1) may be used to place an item that may be larger than items being placed on other levels (i.e., the levels L2 and L3).

Each of the levels L1-L3 may have corresponding physical attributes such as a count of conveyors of each level L1-L3, weight bearing capacity of each level L1-L3, item dimension that could be handled by each level L1-L3, and size of the conveyor of each level L1-L3.

In an embodiment, the height of each level L1-L3 may be adjustable. For increasing a height of an upper level of two adjacent levels, a gap between the upper level and a lower level may be increased. For decreasing a height of the upper level of the two adjacent levels, a gap between the upper level and the lower level may be decreased.

In an embodiment, the first robotic apparatus 120 may transfer received items to the desired location based on a rotation of the conveyors of the levels L1-L3. In some embodiments, the first robotic apparatus 120 may be configured to actuate multiple conveyors of different levels concurrently to execute concurrent transfer of multiple items to corresponding desired locations based on instructions received from the control server 110.

Referring now to FIG. 1C, a second robotic apparatus 122 of the second plurality of robotic apparatus 104 is shown, in accordance with an exemplary embodiment of the disclosure. The second robotic apparatus 122 is used in the storage facility for picking, carrying, and transporting the MSUs 108 from one location to another location within the storage facility. The second robotic apparatus 122 may be configured to communicate with the control server 110 via the communication network 119 by using various wired, wireless, or optical communication protocols. In an example, the second robotic apparatus 122 may include a top plate P1 for lifting the MSUs 108 and a control device (not shown) for controlling a movement (i.e., rotational movement and vertical movement) of the top plate P1 to lift and secure the MSUs 108.

The second robotic apparatus 122 may be configured to receive instructions from the control server 110 for transporting the MSUs 108 between a storage area of the storage facility and a desired location to implement the GTP system 200 (as shown in FIG. 2) or the TTP system 300 (as shown in FIG. 3). The second robotic apparatus 122 may be further configured to secure the MSUs 108 during transportation thereof so that the MSUs 108 do not topple while being transported.

Referring now to FIG. 1D, a third robotic apparatus 124 of the third plurality of robotic apparatus 106 is shown, in accordance with an exemplary embodiment of the disclosure. The third robotic apparatus 124 may include a movement mechanism 130, a movable tray 132, and one or more extensions (not shown).

The movement mechanism 130 may be coupled to the movable tray 132 and may be configured to move the movable tray 132 in upward and downward directions as shown by dotted arrows 134a and 134b. The one or more extensions (for example, arms, prongs, or the like) may be attached to the movable tray 132. Thus, the one or more extensions move along with the movable tray 132 based on the movement of the movement mechanism 130. The one or more extensions may be used to grab and pick a tote from a desired platform and place it on the movable tray 132. Dimensions of the one or more extensions may be dynamically adjustable based on the physical characteristics (for example, the weight, size, dimensions, or the like) of the tote. For example, a distance between two extensions (for example, arms) is adjustable to accommodate totes of different sizes. The movement of the movable tray 132 and the one or more extensions enables the third robotic apparatus 124 to collect a tote from a desired platform or transfer a tote to a desired platform. The third robotic apparatus 124 may further include one or more storage shelves (for example, shelf 136) that may temporarily store empty or filled totes.

The third robotic apparatus 124 is controlled by way of the control server 110. The control server 110 may communicate with the third robotic apparatus 124 by way of the communication network 119 or through separate communication networks established therebetween. Thus, each operation of the third robotic apparatus 124 is controlled by the control server 110 such that a path for the third robotic apparatus 124 to travel in the storage facility and items to be picked up, transported, and unloaded by the third robotic apparatus 124 are determined by the control server 110.

Referring back to FIG. 1A, each of the MSUs 108 store therein multiple items or totes filled with items for fulfillment of one or more orders, maintenance of inventory stock, and/or the like. Examples of the items may include, but are not limited to, groceries, apparel, electronics, or the like. The MSUs 108 may be of any shape, for example, a rectangular shape. Each of the MSUs 108 may include a plurality of shelves on which the items or totes are stored. Arrangement of the MSUs 108 in a storage area of the storage facility may be performed in any desired configuration known to those of skill in the art. For example, the MSUs 108 may be arranged in rows and columns in a way that they form aisles therebetween. In an embodiment, the MSUs 108 may correspond to portable storage units that are movable from one location to another location in the storage facility by any of the second plurality of robotic apparatus 104.

The order consolidation station 116 includes suitable logic, circuitry, interfaces that may be configured to perform one or more operations associated with consolidation of orders. A consolidation of an order may refer to consolidating multiple items of the order at the order consolidation station 116. Multiple orders may be consolidated simultaneously at the order consolidation station 116 by way of multiple order consolidation sections (shown in FIG. 5) at the order consolidation station 116. Further, each order consolidation section may include a corresponding plurality of rollers. The items may be retrieved from various areas of the storage facility and may be transported to the order consolidation station 116 by any of the robotic apparatus 101 based on instructions received from the control server 110. In an example, a first order may include three items. One of the items may be retrieved by the first robotic apparatus 120 from the GTP system 200, the other item may be retrieved by the second robotic apparatus 122 from the TTP system 300, and the remaining item may be retrieved by the third robotic apparatus 124 from the manual operating station 400. Operations of the order consolidation station 116 are controlled by the control server 110.

The order consolidation station 116 may be further equipped with a plurality of sensors SS that include proximity sensors, load sensors, infrared (IR) sensors, weight sensors, or the like. A first set of sensors of the plurality of sensors SS may be proximity sensors that identify whether a robotic apparatus is in proximity to an order consolidation section. The plurality of sensors SS may further include motion sensors to halt or move the plurality of rollers of the order consolidation sections, load sensors to identify whether packages and/or totes have been loaded on the plurality of rollers of the order consolidation sections, and weight sensors, i.e., a second set of sensors, to sense the weight of the placed item on the order consolidation sections. The order consolidation station 116 may be further equipped with IR sensors at both a first side S1 and a second S2 (shown later in FIG. 5) of the order consolidation station 116 so as to identify whether an item or a tote is being transferred to an order consolidation section or whether an item or a tote is being transferred from an order consolidation section. A specific set of IR sensors are reserved for each order consolidation section at both the first side S1 and the second side S2 such that signals from the specific set of IR sensors indicate whether the corresponding order consolidation section is involved in an item transfer or an item reception operation. Each of the aforementioned sensors of the order consolidation station 116 is configured to perform corresponding operations based on instructions received from the control server 110. Further, each of the plurality of sensors SS communicates with the control server 110 by way of corresponding sensor data.

The first side S1 of the order consolidation station 116 may be used to receive items or totes filled with the items from the first robotic apparatus 120. Further, a second side S2 of the order consolidation station 116 may be used to transfer (e.g., push out) items or totes with consolidated orders to another robotic apparatus. In one embodiment, the first side S1 is a left side of the order consolidation station 116 and the second side S2 is a right side of the order consolidation station 116. In another embodiment, the first side S1 may be the right side of the order consolidation station 116 and the second side S2 may be the left side of the order consolidation station 116. In another embodiment, either side of the order consolidation station 116 may be used for receiving items or totes filled with the items and the opposite side in that configuration is used to transfer items or totes with consolidated orders to another robotic apparatus by leveraging the rotation of the plurality of rollers of that order consolidation section. For the sake of brevity of the ongoing disclosure and without deviating from the scope of the disclosure, the order consolidation station 116 is configured to receive items from any of the first plurality of robotic apparatus 102 that may arrive from at least one of the GTP system 200, the TTP system 300, or the manual operating station 400.

Based on various commands received from the control server 110, the first robotic apparatus 120 carrying items for consolidation may arrive at the order consolidation station 116. The control server 110 selects the order consolidation section for consolidating an order such that the first robotic apparatus 120 arrives at the selected order consolidation section. The first robotic apparatus 120 may further align with one of the order consolidation sections, assigned for consolidation of the items to be transferred by the first robotic apparatus 120, at the first side S1. Upon successful alignment with the selected order consolidation section at the first side S1, the first robotic apparatus 120 is configured to transfer the items into a tote placed on the plurality of rollers of the order consolidation section.

Each order consolidation section is configured to receive items from any of the first plurality of robotic apparatus 102 in the vicinity of the order consolidation section and deliver the tote of consolidated order to any of the first plurality of robotic apparatus 102 that are in the vicinity of the order consolidation section based on instructions received from the control server 110. The operations occurring at the order consolidation station 116 have been explained in detail in conjunction with FIG. 5.

The control server 110 may be a network of computers, a software framework, or a combination thereof, that may provide a generalized approach to create an implementation of the control server 110. Examples of the control server 110 may include, but are not limited to, personal computers, laptops, mini-computers, mainframe computers, any non-transient and tangible machine that can execute a machine-readable code, cloud-based servers, distributed server networks, or a network of computer systems. The control server 110 may be realized through various web-based technologies such as, but not limited to, a Java web framework, a .NET framework, a personal home page (PHP) framework, or any web-application framework. The control server 110 may be maintained by a management authority of the storage facility or a third-party entity that facilitates inventory management operations for the storage facility. The control server 110 may be part of an automated warehouse management system (WMS), which may be a standalone system. Alternatively, the control server 110 may be integrated with the automated WMS. In certain embodiments, the control server 110 may be integrated with supply chain systems and/or integrated enterprise resource planning (ERP) systems. It will be apparent to a person of ordinary skill in the art that the control server 110 may perform various management operations of the storage facility along with inventory tracking and management operations.

Figure 8:
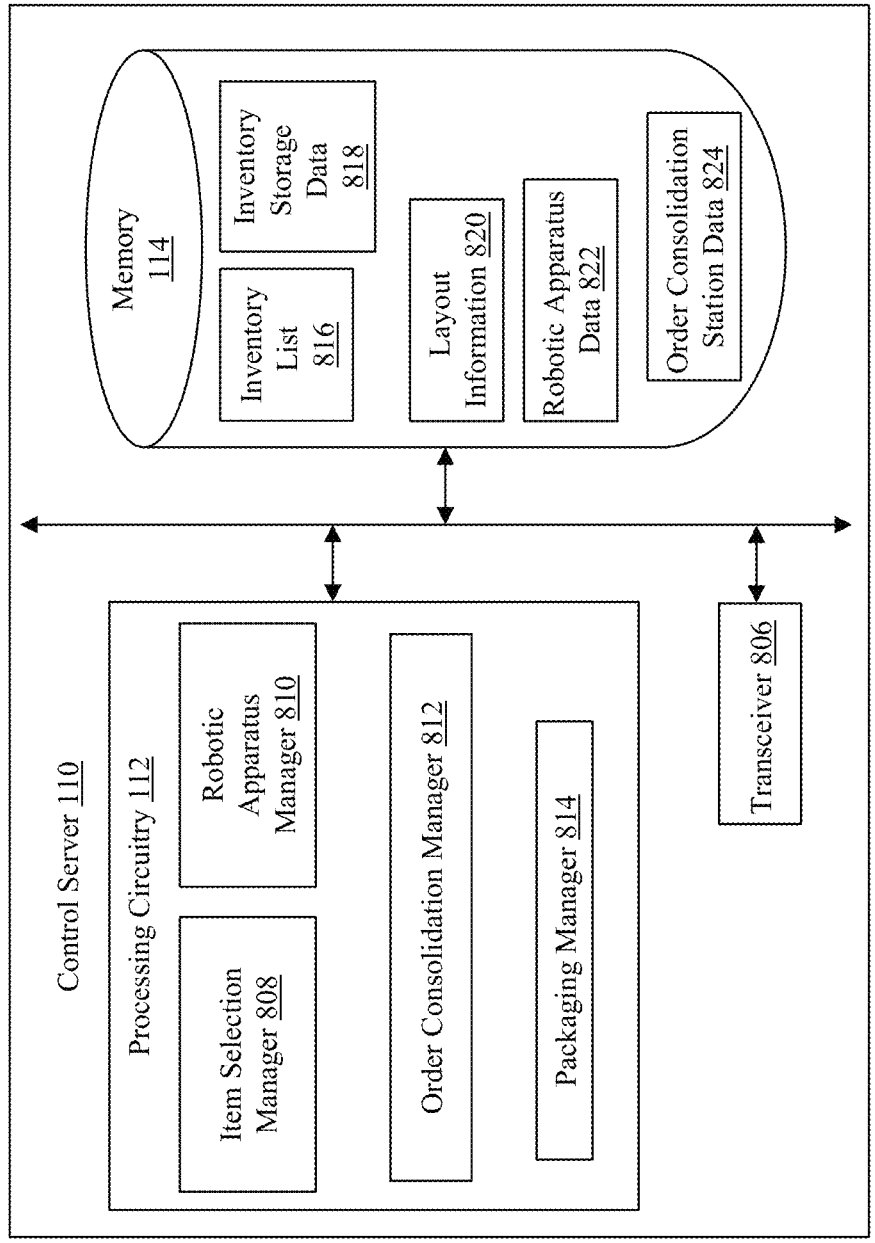
FIG. 8 is a diagram that illustrates an implementation of the control server of the order consolidation system of FIG. 1A.

The control server 110 may be further configured to store, in a memory 114 (as shown in FIG. 8) of the control server 110, layout information of the storage facility and data associated with the items, the robotic apparatus 101, and the like. The structure of the control server 110 has been explained in detail in FIG. 8. The control server 110 is configured to perform various other operations that include identifying the location of items of an order, selection of any of the robotic apparatus 101 to travel to the identified location of the storage facility for receiving the items and another path for transporting the items from the identified location to a location of the order consolidation station 116, identifying and communicating a path for the selected robotic apparatus 101 to arrive at the identified location, estimating a threshold distance for the arrival of the selected robotic apparatus 101 at a first side S1 or a second side S2, and detecting an arrival of the selected robotic apparatus 101 at the order consolidation station 116 at the first side S1 of the order consolidation station 116 and within the first threshold distance of a first order consolidation section 503a (shown in FIG. 5) based on first sensor data. It will be understood by a person skilled in the art that the first side S1 of the order consolidation station 116 is same as the first side S1 of the first order consolidation section 503a. Similarly, the second side S2 of the order consolidation station 116 is same as the second side S2 of the first order consolidation section 503a. The operations of the control server 110 further include retrieving from the memory 114, stored item data associated with the item placed on the selected robotic apparatus 101 based on item data received from any of the plurality of sensors SS of the order consolidation station 116 and comparing the stored item data with the received item data to determine whether a correct item has been placed for order consolidation. The other operations performed by the control server 110 may further include activating, the plurality of rollers, based on a match between the item data and the stored item data of the first item, detecting that another robotic apparatus has arrived at the second side S2 of the order consolidation station 116 and is within a second threshold distance of the first order consolidation section 503a, communicating to the order consolidation station 116 such that each order consolidation section of the order consolidation station 116 is configured to identify a corresponding robotic apparatus and accept the items or tote filled with the items associated with the robotic apparatus by moving the plurality of rollers associated with the identified robotic apparatus, rotating plurality of rollers in an anti-clockwise direction or a clockwise direction and halting the plurality of rollers by way of the motors while a robotic apparatus is transferring an item or a tote on the plurality of rollers, controlling the transfer of the item to the other robotic apparatus, and controlling the transport of the item by way of the robotic apparatus for packaging the order to the packaging station 118.

Figure 5:
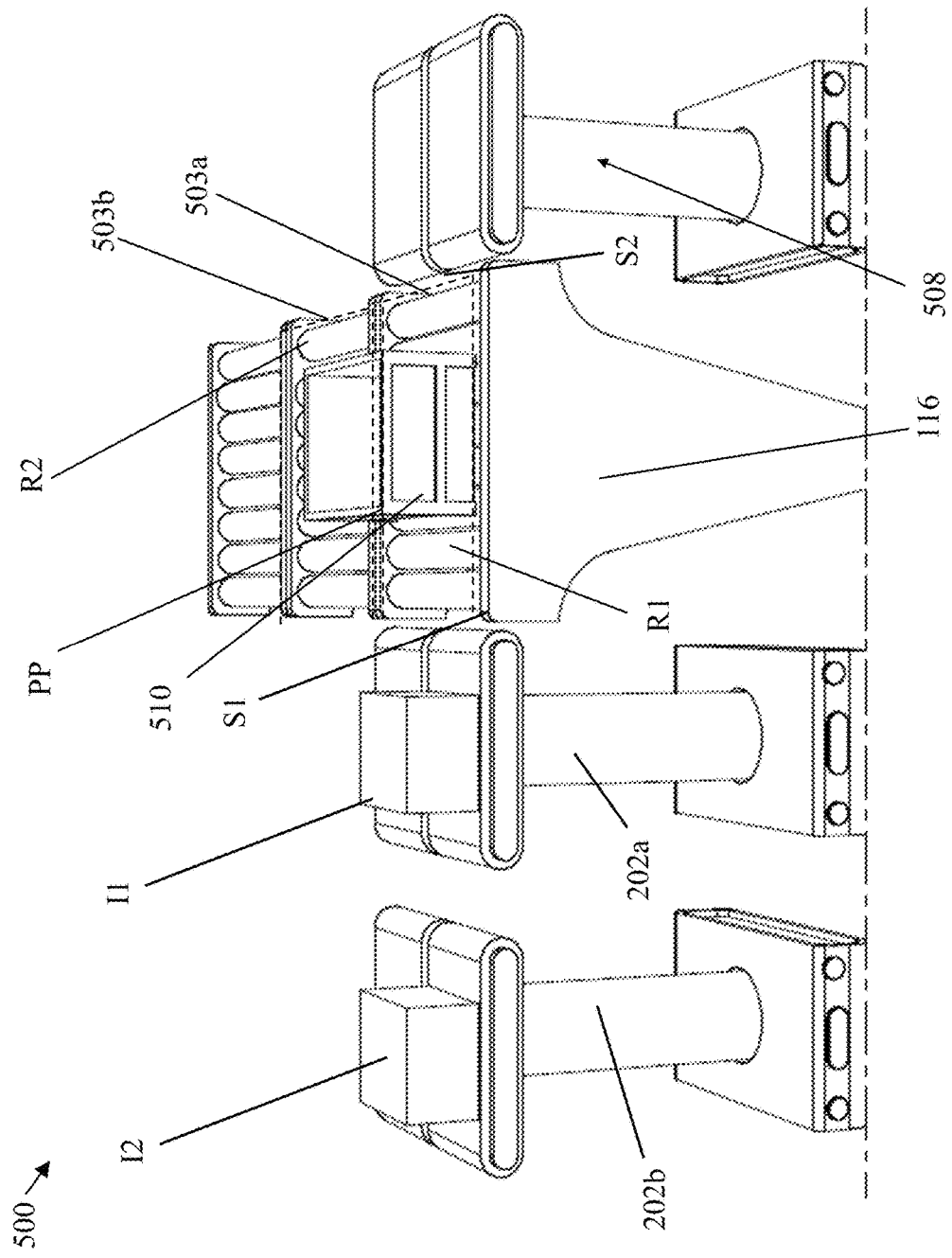
FIG. 5 is a diagram that illustrates an order consolidation area in the storage facility of FIG. 1A where orders are automatically consolidated, in accordance with an embodiment of the present disclosure.

The control server 110 may be further configured to dedicate, some of the first plurality of robotic apparatus 102 for the first order consolidation section 503a and the remaining first plurality of robotic apparatus 102 may be dedicated for the second order consolidation section 503b (shown in FIG. 5). The first robotic apparatus 120 dedicated to the first order consolidation section 503a is set to arrive at the first order consolidation section 503a within a predetermined time period of a time instance, for example, within a predetermined time period of receiving items or totes from the GTP system 200, the TTP system 300, or the manual operating station 400. In an example, the first robotic apparatus 120 may be set to arrive at the first order consolidation section 503a within the predetermined time period (e.g., 5 minutes) of a first time instance (e.g., 10:10 AM) when items were received by the first robotic apparatus 120 from the GTP system 200. Thus, if the first robotic apparatus 120 does not arrive at the first order consolidation section 503a between 10:05 AM to 10:15 AM, the control server 110 further communicates with the first robotic apparatus 120 and/or the order consolidation station 116 regarding the non-arrival of the first robotic apparatus 120 within the predetermined time period and generates corresponding corrective actions.

In addition, if two robotic apparatus arrive at the same time instance at an order consolidation section, the robotic apparatus are queued at the order consolidation section. In an event that the plurality of rollers of the order consolidation section do not roll for unloading the tote to the other robotic apparatus, the control server 110 determines a failure in unloading of the tote and detects the failure in an operation of at least one of the other robotic apparatus and/or the order consolidation station 116. The control server 110 further generates corrective actions to identify and correct the identified failure of operation. The operations of the control server 110 have been explained in detail in conjunction with FIG. 5.

The packaging station 118 includes suitable logic, circuitry, and interfaces that may be configured to perform one or more operations associated with packaging of orders. Packaging a single order may include packaging items associated with the order that are brought to the packaging station 118 by any of the robotic apparatus 101. The packaging of orders has been explained in detail in FIG. 6 and FIG. 7.

The communication network 119 may include suitable logic, circuitry, and interfaces that may be configured to provide a plurality of network ports and a plurality of communication channels for transmission and reception of data related to operations of various entities such as the first plurality of robotic apparatus 102, the second plurality of robotic apparatus 104, the third plurality of robotic apparatus 106, the MSUs 108, the control server 110, the order consolidation station 116, and the packaging station 118. Each network port may correspond to a virtual address (or a physical machine address) for transmission and reception of the communication data. For example, the virtual address may be an Internet Protocol Version 4 (IPV4) (or an IPV6 address) and the physical address may be a Media Access Control (MAC) address. The communication network 119 may be associated with an application layer for the implementation of communication protocols based on one or more communication requests from at least one of the one or more communication devices (e.g., I/O devices). The communication data may be transmitted or received, via the communication protocols. Examples of the communication protocols may include, but are not limited to, Hypertext Transfer Protocol (HTTP), File Transfer Protocol (FTP), Simple Mail Transfer Protocol (SMTP), Domain Network System (DNS) protocol, Common Management Interface Protocol (CMIP), Transmission Control Protocol and Internet Protocol (TCP/IP), User Datagram Protocol (UDP), Long Term Evolution (LTE) communication protocols, or any combination thereof.

The communication data may be transmitted or received via at least one communication channel of a plurality of communication channels in the communication network 119. The communication channels may include, but are not limited to, a wireless channel, a wired channel, or a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a metropolitan area network (MAN), a satellite network, the Internet, a fiber optic network, a coaxial cable network, an infrared (IR) network, a radio frequency (RF) network, and a combination thereof.

FIG. 2 is a diagram that illustrates an exemplary environment of the GTP system 200 implementation in the storage facility, in accordance with an exemplary embodiment of the disclosure. The GTP system 200 may be present at a first location of the storage facility, and is implemented using the first plurality of robotic apparatus 102 such as a fourth robotic apparatus 202a, the second plurality of robotic apparatus 104 such as the second robotic apparatus 122, and the MSUs 108 such as a first MSU 206. The fourth robotic apparatus 202a is structurally and functionally similar to the first robotic apparatus 120 and includes the level L1. In the current embodiment, the fourth robotic apparatus 202a may not include the levels L2 and L3.

In an exemplary scenario, the fourth robotic apparatus 202a may convey a filled tote with items or items without the totes from one station of another system to the GTP system 200. In an example, an operator 208 stationed at the GTP system 200 may retrieve items from the filled tote or directly from the top level L1 of the fourth robotic apparatus 202a and place the retrieved items in the first MSU 206. In another exemplary scenario, the fourth robotic apparatus 202a may carry an empty tote or may travel without the tote to the GTP system 200. When the control server 110 detects an arrival of the fourth robotic apparatus 202a at the first location and in the vicinity of the GTP system 200, the control server 110 provides details (such as a location and type) of the items (such as a first item I1) to be placed on the fourth robotic apparatus 202a on a display screen (not shown) of the GTP system 200 for the operator 208. The operator 208 may thus retrieve the first item I1 from the first MSU 206, and place the first item I1 retrieved from the first MSU 206 (as displayed on the display screen) in the tote or directly on the top level L1 of the fourth robotic apparatus 202a if the tote is absent. In another embodiment, the fourth robotic apparatus 202a may directly receive items retrieved from the first MSU 206 on the second and third levels L2 and L3 thereof.

FIG. 3 is a diagram that illustrates an exemplary environment of a TTP system 300 implementation in the storage facility, in accordance with an exemplary embodiment of the disclosure. The TTP system 300 is implemented using the first plurality of robotic apparatus 102 such as a fifth robotic apparatus 301, a sixth robotic apparatus 302a and a seventh robotic apparatus 302b of the third plurality of robotic apparatus 106, and a conveying mechanism 304. The sixth robotic apparatus 302a is structurally and functionally similar to the third robotic apparatus 124.

The conveying mechanism 304 may include rollers that are rotatable to achieve a conveying operation for the conveying mechanism 304. In an embodiment, the conveying mechanism 304 may be further supplemented with other conveying mechanisms that have rollers aligned perpendicular to the rollers of the conveying mechanism 304 so as to convey totes onto the conveying mechanism 304.

In operation, the movable tray 132 and the one or more extensions of the sixth robotic apparatus 302a may retrieve a tote 305 from one of the shelves and transfer the tote 305 to the conveying mechanism 304 based on a control performed by the control server 110. An operator 306 (human or robot) at the TTP system 300 either picks up the tote 305 or one or more items from the tote 305 and places the picked items or the tote 305 on the fifth robotic apparatus 301 as per instructions received from the control server 110 on a display screen (not shown) of the TTP system 300. For example, as shown in FIG. 3, the operator 306 picks up a second item I2 from the tote 305 and places the second item I2 on the fifth robotic apparatus 301. The emptied tote 305 is collected by the seventh robotic apparatus 302b from the conveying mechanism 304.

FIG. 4 is a schematic diagram that illustrates an exemplary environment of a manual operating station 400 implementation in the storage facility, in accordance with an exemplary embodiment of the disclosure. The manual operating station 400 has a plurality of operators 402 and 404 that perform various pick/put operations on items or item totes. In operation, the operator 402 may bring totes (for example, a tote 406) or items to the manual operating station 400 and place the totes or items on a platform 408. Based on instructions received from the control server 110 on a display screen (not shown) at the manual operating station 400, the operator 404 may pick items (for example, an item 410) or totes from the platform 408 and may place the picked item or the picked tote on one of the first plurality of robotic apparatus 102 such as an eighth robotic apparatus 412 waiting at the manual operating station 400 for receiving the items or the totes.

FIG. 5 is a diagram that illustrates the order consolidation area 500 in the storage facility where orders are automatically consolidated, in accordance with an embodiment of the present disclosure. The order consolidation area 500 depicts the order consolidation station 116 that is equipped with multiple order consolidation sections such as the first order consolidation section 503a and the second order consolidation section 503b. The first order consolidation section 503a and the second order consolidation section 503b includes a plurality of rollers such as a first plurality of rollers R1 and a second plurality of rollers R2, respectively. In one embodiment, a number of rollers in each order consolidation section are same. In another embodiment, different number of rollers are included in every order consolidation section. The first plurality of rollers R1 are arranged in parallel configuration with each other. Similarly, the second plurality of rollers R2 are arranged in parallel configuration with each other. The first plurality of rollers R1 are rotatable in anti-clockwise direction or clockwise direction. Similarly, the second plurality of rollers R2 are rotatable in anti-clockwise direction or clockwise direction. Each operation of the order consolidation station 116 is controlled based on instructions received from the control server 110.

The length, width, weight, shape, and height of the order consolidation station 116 is based on an area in which the order consolidation station 116 is mounted. In an embodiment, the order consolidation station 116 may be firmly fixed on the floor of the area using suitable mounting techniques. In another embodiment, the order consolidation station 116 may be a portable structure that may be temporarily fixed on the floor. Further, each order consolidation section is separated from the other order consolidation sections by a partition. In an example, a first partition PP separates the first order consolidation section 503a from the second order consolidation section 503b. In addition, each order consolidation section is configured to consolidate a corresponding order that is determined by the control server 110.

The order consolidation station 116 further includes one or more actuation mechanisms (for example, motors) that are configured to rotate the first plurality of rollers R1 and the second plurality of rollers R2 in a clockwise or anti-clockwise direction based on commands received from the control server 110. In an example, the motors may be mounted on a frame of the order consolidation station 116. The order consolidation station 116 may be remotely controlled by the control server 110 by way of a control circuitry (not shown) of the order consolidation station 116. In other words, the one or more actuation mechanisms (e.g., the motors) control the rotation of the first plurality of rollers R1 and the second plurality of rollers R2 under the control of the control server 110. The one or more actuation mechanisms rotate the first plurality of rollers R1 independently of the second plurality of rollers R2. For example, when the first plurality of rollers R1 are rotated in a clockwise direction, the second plurality of rollers R2 may rotate in a clockwise direction or an anti-clockwise direction or may not rotate at all. The one or more actuation mechanisms may further control a speed of rotation of the first plurality of rollers R1 and the second plurality of rollers R2, independently. The speed of rotation of the first plurality of rollers R1 and the second plurality of rollers R2 may be determined by the control server 110. In an embodiment, the one or more actuation mechanisms may be further configured to rotate only some of the first plurality of rollers R1 such that the remaining first plurality of rollers R1 are stationary. The number of the first plurality of rollers R1 that may rotate or remain stationary is determined by the control server 110.

In an embodiment, a height of the order consolidation station 116 is fabricated to correspond to a height of a robotic apparatus arriving at the order consolidation station 116. A third set of sensors such as a height measuring sensor (not shown) of the order consolidation station 116 measures a height of a robotic apparatus such as any of the first plurality of robotic apparatus 102, and provides the measured height to the control server 110. The control server 110 compares the received height of any of the first plurality of robotic apparatus 102 with the height of the order consolidation station 116. In an event, that the control server 110 determines a mismatch between the height of the order consolidation station 116 and any of the first plurality of robotic apparatus 102, the control server 110 activates a roll-up and roll-down mechanism DU of the order consolidation station 116. The roll-up and roll-down mechanism DU is configured to lift the order consolidation station 116 or may have an extendible arm to receive an item from the first plurality of robotic apparatus 102.

In operation, the control server 110 is configured to determine items associated with a first order that may be placed by a user (not shown). In an example, the first item I1 and the second item I2 may be associated with the first order. The control server 110 is further configured to determine locations of the first item I1 and the second item I2 in the storage facility. In an example, the first item I1 is located at a first location, i.e., a location of the GTP system 200, and the second item is located at a second location, i.e., a location of the TTP system 300. The control server 110 selects any two of the robotic apparatus 101 to travel to the first location and the second location, respectively. In an example, the two selected robotic apparatus 101 are the fourth robotic apparatus 202a and the fifth robotic apparatus 301. The selection of the robotic apparatus 101 may be based on a location of any of the robotic apparatus 101 in a vicinity of the first location and the second location, travel time to the first location and the second location and the order consolidation station 116, availability of any of the robotic apparatus 101, and the like.

The control server 110 thus further identifies a first path of the fourth robotic apparatus 202a and a second path of the fifth robotic apparatus to arrive at the first location and the second location of the storage facility, respectively. The first path is communicated to the fourth robotic apparatus 202a and the second path is communicated to the fifth robotic apparatus 301 by the control server 110 to control an arrival of the fourth robotic apparatus 202a at the first location and the fifth robotic apparatus 301 at the second location, respectively. The first path and the second path may be communicated simultaneously or one after the other by the control server 110 to the fourth robotic apparatus 202a and the fifth robotic apparatus 301, respectively. The control server 110 further identifies the order consolidation station 116 and a corresponding order consolidation section such as the first order consolidation section 503a for consolidating the first order.

When the fourth robotic apparatus 202a arrives at the first location, the operator 208 retrieves the first item I1 as indicated on the display screen (based on instructions received from the control server 110) of the GTP system 200 and places the first item I1 on the fourth robotic apparatus 202a. Similarly, when the fifth robotic apparatus 301 arrives at the second location, the operator 306 retrieves the second item I2 as indicated on the display screen of the TTP system 300 (based on instructions received from the control server 110) and places the second item I2 on the fifth robotic apparatus 301. Thus, the first item I1 is placed on the fourth robotic apparatus 202a based on the arrival of the fourth robotic apparatus 202a at the first location and the second item I2 is placed on the fifth robotic apparatus 301 based on the arrival of the fifth robotic apparatus 301 at the second location. The control server 110 further estimates a first time period for the arrival of the fourth robotic apparatus 202a at the first location and a second time period for the arrival of the fifth robotic apparatus 301 at the second location.

The control server 110 further identifies and communicates a third path of the fourth robotic apparatus 202a and a fourth path of the fifth robotic apparatus 301 to control arrival of the fourth robotic apparatus 202a and the fifth robotic apparatus 301 at the first side S1, respectively. It will be apparent to a person skilled in the art that the time of identification and communication of the third path and the fourth path by the control server 110 may occur at the time of identification and communication of the first path and the second path. In addition, the control server 110 may further select a ninth robotic apparatus 508 of the first plurality of robotic apparatus 102 to receive the first item I1 and the second item I2 at the order consolidation station 116 and thus identifies and communicates a fifth path for the ninth robotic apparatus 508 to travel to the order consolidation station 116. The control server 110 further estimates a third time period for the arrival of the ninth robotic apparatus 508 to arrive at the second side S2 of the order consolidation station 116.

The control server 110 detects that the fourth robotic apparatus 202a and the fifth robotic apparatus 301 have arrived at the first side S1 of the order consolidation station 116 and are within a first threshold distance of the first order consolidation section 503a by way of the first set of sensors. The first set of sensors senses a presence of the fourth robotic apparatus 202a and the fifth robotic apparatus 301 in the first threshold distance and provides the first sensor data indicating a distance of the fourth robotic apparatus 202a and the fifth robotic apparatus 301 from the first side S1 of the first order consolidation section 503a. Based on the received distance from the first set of sensors, the control server 110 thus detects by way of comparison of the received distance with the estimated threshold distance whether the fourth robotic apparatus 202a and the fifth robotic apparatus 301 are within the first threshold distance. The control server 110 further detects that the ninth robotic apparatus 508 has arrived at the second side S2 of the order consolidation station 116 and is within a second threshold distance of the first order consolidation section 503a based on the first sensor data received from the proximity sensors of the order consolidation station 116. The first and second threshold distances are determined by the control server 110 and are communicated to the first set of sensors, i.e., the proximity sensors of the order consolidation station 116 such that the proximity sensors are configured to sense a presence of the fourth robotic apparatus 202a and the fifth robotic apparatus 301 within the first threshold distance, and the ninth robotic apparatus 508 within the second threshold distance.

The control server 110 further estimates a fourth time period for the arrival of the fourth robotic apparatus 202a at the first side S1 of the order consolidation station 116, and a fifth time period for the fifth robotic apparatus 301 to arrive at the first side S1 of the order consolidation station 116. The fourth time period, the fifth time period, and the third time period are estimated to detect the arrival of the fourth robotic apparatus 202a within the fourth time period, the fifth robotic apparatus 301 within the fifth time period, and the ninth robotic apparatus 508 within the third time period, respectively. The control server 110 further generates a first notification based on the detection of at least one of non-arrival of the fourth robotic apparatus 202a and the fifth robotic apparatus 301 at the first side S1, within the first threshold distance, and the fourth time period and the fifth time period, respectively, and the ninth robotic apparatus 508 at the second side S2 within the second threshold distance and the third time period. The first notification is indicative of corrective measures that are implemented by the control server 110 such that at least one of the fourth robotic apparatus 202a and the fifth robotic apparatus 301 arrive at the first side S1 within the fourth time period and the fifth time period, respectively, and are within the first threshold distance and the ninth robotic apparatus 508 arrives at the second side S2 within the third time period and is within the second threshold distance.

The control server 110 further determines whether the fourth robotic apparatus 202a and the fifth robotic apparatus 301 simultaneously arrive at the first side S1 of the order consolidation station 116. Based on the determination that the fourth robotic apparatus 202a and the fifth robotic apparatus 301 simultaneously arrive at the order consolidation station 116, the control server 110 queues the fifth robotic apparatus 301 after the fourth robotic apparatus 202a.

When the fourth robotic apparatus 202a is detected to have arrived at the first side S1 and is within the first threshold distance of the order consolidation station 116, the fourth robotic apparatus 202a is configured to place the first item I1 on the first order consolidation section 503a based on instructions received from the control server 110. Similarly, when the fifth robotic apparatus 301 is detected to have arrived at the first side S1 and is within the first threshold distance of the order consolidation station 116, the fifth robotic apparatus 301 is configured to place the second item I2 on the first order consolidation section 503a based on instructions received from the control server 110. In one embodiment, the second item I2 may be placed after the first item I1 is transferred to the second side S2 of the order consolidation station 116. In another embodiment, the second item I1 may be placed after the first item I1 on the first order consolidation section 503a and before the first plurality of rollers R1 are activated.

When at least one of the first item I1 and the second item I2 are placed on the first plurality of rollers R1 at the first side S1, item data associated with at least one of the first item I1 and the second item I2 are received by the control server 110 to determine a match between the item data of the first item I2 and the second item I2 and stored item data associated with the first item I1 and the second item I2, respectively. The stored item data is retrieved from the memory 114 of the control server 110. The item data associated with the first item I1 and the second item I2 includes at least one of a weight, a size (such as large and small), dimensions (such as length, breadth, and height), and a type (such as solid, liquid, or type of material, or type of usage such as hygiene product or cosmetic product) of the first item I1 and the second item I2, respectively. Further, the control server 110 may receive the item data associated with at least one of the first item I1 and the second item I2 from the second set of sensors. In an example, when the first item I1 is placed on the first plurality of rollers R1 at the first side S1, the second set of sensors of the plurality of sensors SS sense the item data of the first item I1. In an example, the item data corresponds to a sensed weight of the first item I1 and is 1 kilogram (kg). The sensed weight is thus transmitted by the second set of sensors to the control server 110. The control server 110 retrieves the stored item data, i.e., stored weight, of the first item I1 from the memory 114 to compare the stored weight with the sensed weight of the first item I1. If the stored weight matches the sensed weight, i.e., the stored weight is 1 kg, the control server 110 may indicate to the order consolidation station 116 to transfer the first item I1 to the second side S2 of the order consolidation station 116. In other words, the control server 110 communicates with the motion sensors of the order consolidation station 116 to activate the first plurality of rollers R1 such that the first item I1 is transferred from the first side S1 to the second side S2. In an event that the stored weight does not match the sensed weight, i.e., the stored weight may be greater than or less than 1 kg, the control server 110 indicates to the order consolidation station 116 to halt the transfer (thereby deactivating the first plurality of rollers R1) of the first item I1 to the second side S2 of the order consolidation station 116. The control server 110 further communicates with the ninth robotic apparatus 508 to refrain from accepting the first item I1. The ninth robotic apparatus 508 may thus move beyond the second threshold distance. Similarly, the item data for the second item I2 is sensed. In one embodiment, the first plurality of rollers R1 may remain activated until both the first item I1 and the second item I2 are transferred from the first side S1 to the second side S2. In another embodiment, the first plurality of rollers R1 may be deactivated after the first item I1 may be transferred to the second side S2 and be activated again to transfer the second item I2 to the second side S2.

When the stored weight of the first item I1 matches the sensed weight of the first item I1, the control server 110 communicates with the ninth robotic apparatus 508 to receive the first item I1. The first item I1 is thus transferred by activating the first plurality of rollers R1 from the first side S1 to the second side S2 on the ninth robotic apparatus 508. The control server 110 may further determine a mismatch of height between the second side S2 of the order consolidation station 116 and the ninth robotic apparatus 508 to activate the roll-up and roll-down mechanism DU to enable transfer of the first item I1 from the order consolidation station 116 to the ninth robotic apparatus 508. Similarly, the second item I2 is transferred to the ninth robotic apparatus 508. Thus, the first item and I1 the second item I2 are transferred to the ninth robotic apparatus 508 based on the detection that the ninth robotic apparatus 508 has arrived at the second side S2 and is within the second threshold distance. The control server 110 further deactivates the first plurality of rollers R1 when the first item I1 and the second item I2 are transferred to the ninth robotic apparatus 508.

In an example, a tote 510 may be placed on the first plurality of rollers R1 or on the ninth robotic apparatus 508 to receive (i) the first item I1 from the fourth robotic apparatus 202a and the second item I2 from the fifth robotic apparatus 301 or (ii) the first plurality of rollers R1. In one embodiment, the control server 110 may further be configured to instruct at least one of the fourth robotic apparatus 202a and the fifth robotic apparatus 301 based on a placement of the tote 510 on the first plurality of rollers R1, to place the first item I1 and the second item I2 in the tote 510. In another embodiment, the control server 110 may further be configured to detect whether the first item I1 and the second item I2 have been transferred from the first plurality of rollers R1 to the tote 510 placed on ninth robotic apparatus 508. The tote 510 may be transported to the order consolidation station 116 by way of the ninth robotic apparatus 508 or any other robotic apparatus of the first plurality of robotic apparatus 102.

The control server 110 detects a successful transfer of both the first item I1 and the second item I2 to the ninth robotic apparatus 508 and controls, i.e., communicates with the ninth robotic apparatus 508 to transport the first item I1 and the second item I2 for packaging the first order to the packaging station 118. The ninth robotic apparatus 508 may transport the first item I1 and the second item I2 by way of the tote 510 to the packaging station 118. Further, if an operational failure occurs at the first order consolidation section 503a and/or the order consolidation station 116, the control server 110 is further configured to detect such operational failures and re-route the fourth robotic apparatus 202a, the fifth robotic apparatus 301, and the ninth robotic apparatus 508 to another order consolidation section of the order consolidation station 116 and/or to a different order consolidation station in the storage facility. Though the first order is shown to include the first item I1 and the second item I2, it will be understood by a person skilled in the art that more than two items may be associated with the first order. Further, other robotic apparatus from the second plurality of robotic apparatus 104 may be associated with the first order to bring the items of the first order.

Figure 6:
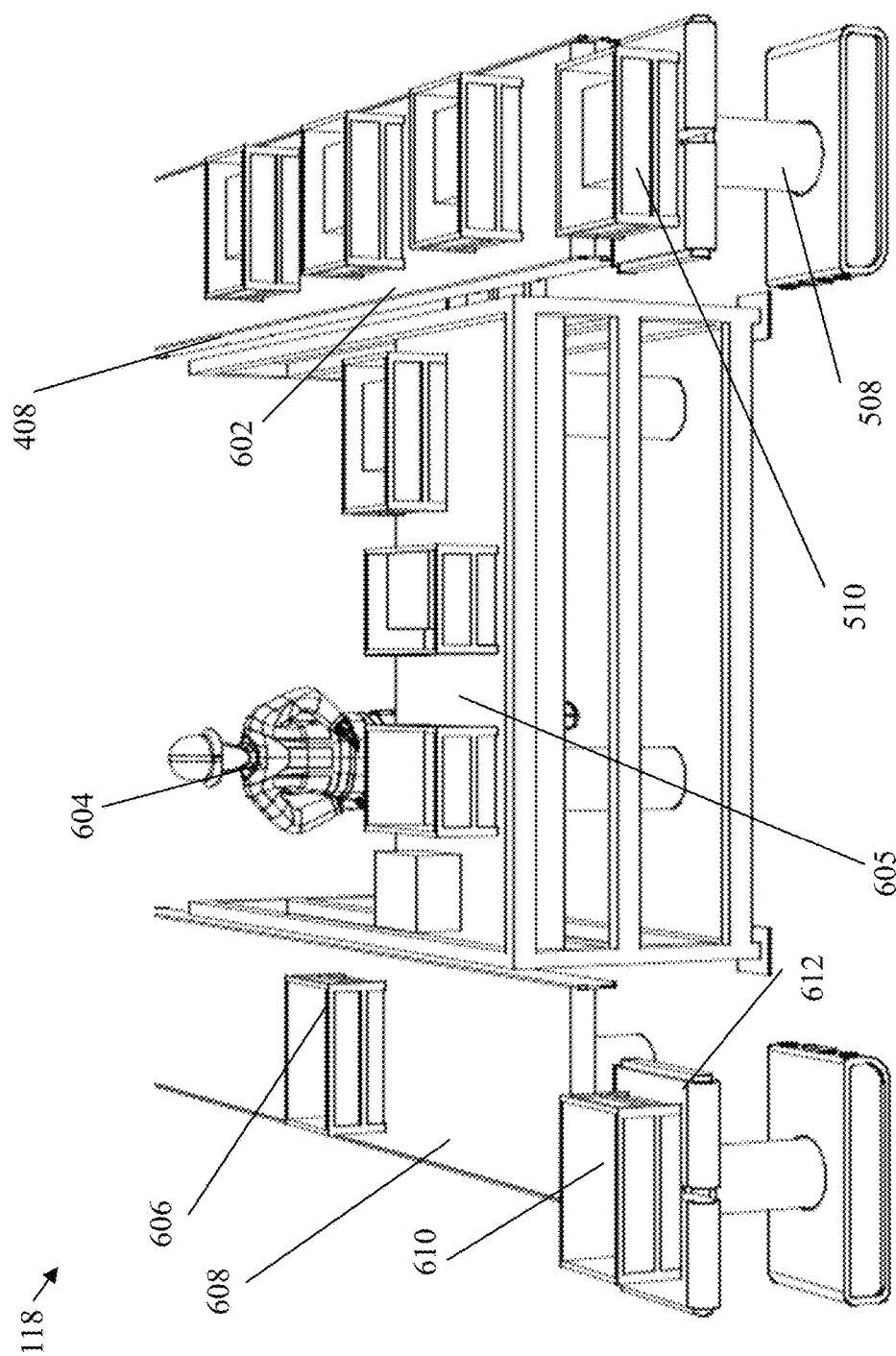
FIG. 6 is a diagram that illustrates a packaging station in the storage facility of FIG. 1A, in accordance with an embodiment of the present disclosure.

FIG. 6 is a diagram that illustrates the packaging station 118 in the storage facility, in accordance with an embodiment of the present disclosure. When the ninth robotic apparatus 508 arrives at the packaging station 118, the control server 110 controls the ninth robotic apparatus 508 to unload the first item I1 and the second item I2 onto an inbound conveying mechanism 602 at the packaging station 118. The inbound conveying mechanism 602 is further equipped with sensors to detect presence of the filled totes such as the filled tote 510. The packaging station 118 thus moves (e.g., rotates) a corresponding conveyor so that the totes on the inbound conveying mechanism 602 are brought in the reach of an operator 604 at the packaging station 118. Once a tote is in the reach of the operator 604, the rotation of the conveyors is halted and the operator 604 picks the tote from the inbound conveying mechanism 602 for packaging. In another embodiment, the operator 604 may be replaced with a humanoid or a robot. The operator 604 places the picked tote on a packaging section 605 and starts removing the items from the picked tote for packaging, for example, for labelling, putting the items in a carton, bubble wrapping the items, or the like. After removing the items from the picked tote, the operator 604 places the empty tote (for example, a tote 606) on an outbound conveying mechanism 608 at the packaging station 118. The outbound conveying mechanism 608 also includes one or more conveyors which upon rotation, transfer the empty tote (for example, a tote 610) on a tenth robotic apparatus 612 of the first plurality of robotic apparatus 102 waiting at one end of the outbound conveying mechanism 608. The empty tote 610 received by the tenth robotic apparatus 612 is again used for order consolidation, thereby auto-replenishing the totes for order consolidation. Similarly, the tote 510 is auto-replenished. Subsequently, the conveyors of the inbound conveying mechanism 602 are rotated again so as to bring the next tote on the inbound conveying mechanism 602 to the reach of the operator 604. Thus, the consolidation and packaging for a single order is performed. Similarly, the consolidation and packaging for multiple orders are performed at the order consolidation station 116 and the packaging station 118.

Figure 7:
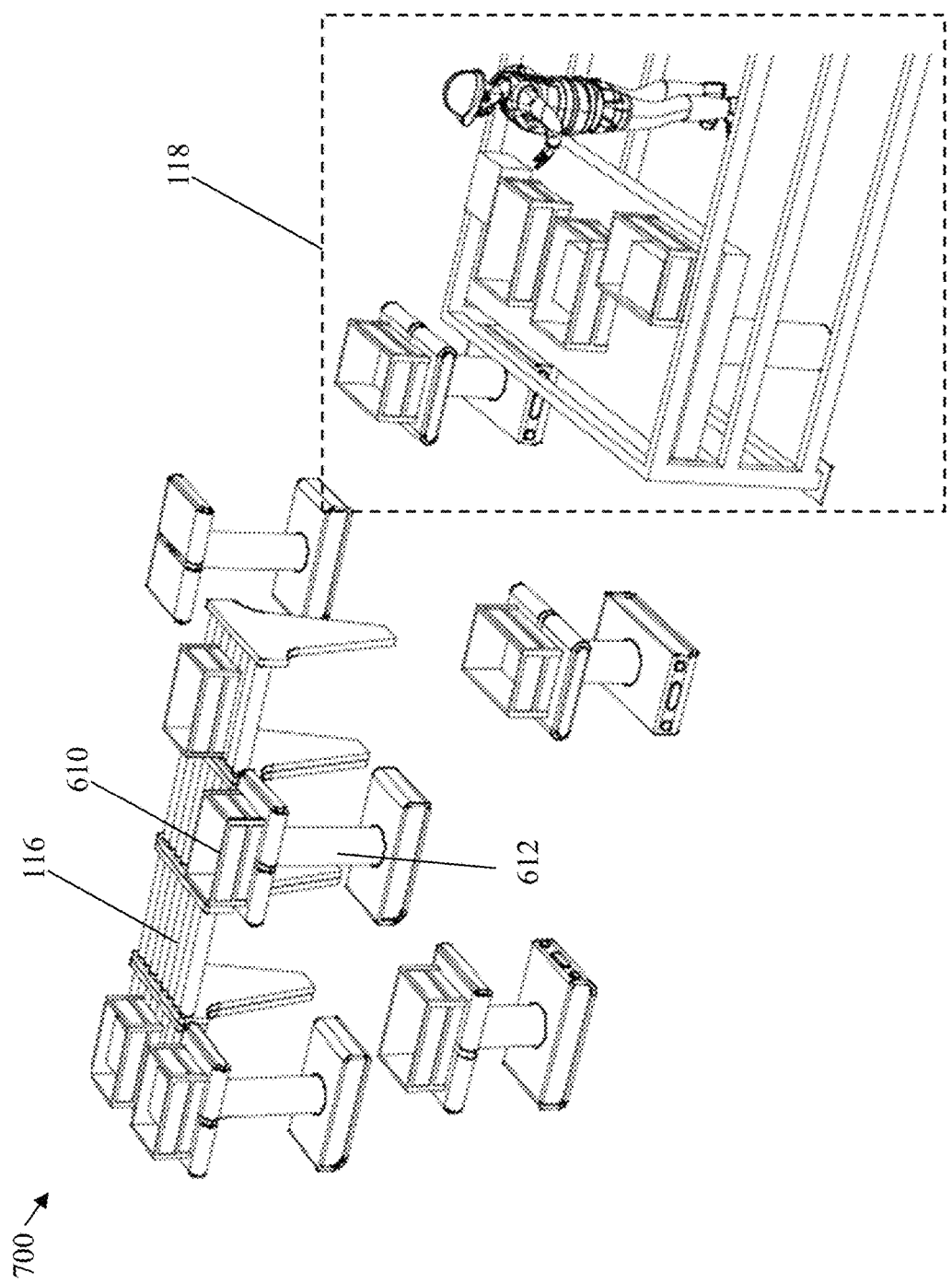
FIG. 7 is a diagram that illustrates an order consolidation station in combination with the packaging station in the storage facility of FIG. 1A, in accordance with an embodiment of the present disclosure.

FIG. 7 is a diagram 700 that illustrates the order consolidation station 116 in combination with the packaging station 118 in the storage facility, in accordance with an embodiment of the present disclosure. In operation, the tenth robotic apparatus 612 carrying an empty tote 610 travels from the packaging station 118 to the order consolidation area 500 and transfers the empty tote 610 to one of the order consolidation sections of the order consolidation station 116. The empty tote 610 is then used to consolidate another order at the order consolidation station 116. Therefore, the movement of any of the first plurality of robotic apparatus 102 from the order consolidation station 116 to the packaging station 118 to transfer the filled totes and the movement of any of the first plurality of robotic apparatus 102 to the order consolidation station 116 from the packaging station 118 to transfer the empty totes auto-replenishes the totes based on the requirement. In case empty totes are not required at the order consolidation station 116, the first plurality of robotic apparatus 102 may transfer the empty totes to another stations or systems in the storage facility.

FIG. 8 is a block diagram 800 that illustrates an implementation of the control server 110, in accordance with an exemplary embodiment of the present disclosure. The control server 110 may include the processing circuitry 112, the memory 114, and a transceiver 806. The processing circuitry 112 may include an item selection manager 808, a robotic apparatus manager 810, an order consolidation manager 812, and a packaging manager 814. It will be apparent to a person having ordinary skill in the art that the structure of the control server 110 is for illustrative purposes and not limited to any specific combination of hardware circuitry and/or software.

The processing circuitry 112 may execute and manage various operations (such as, selecting items for consolidation in the storage facility, selecting robotic apparatus to pick-up and transport items for consolidation, managing operations at the order consolidation station 116, and the packaging station 118, and the like. The processing circuitry 112 may execute the operations using the item selection manager 808, a robotic apparatus manager 810, an order consolidation manager 812, and a packaging manager 814.

The item selection manager 808 may include suitable logic, instructions, circuitry, interfaces, and/or code for selecting items for transfer in the storage facility. The item selection manager 808 may be configured to select a set of items of the plurality of items that are associated with a corresponding order received by the control server 110. The set of items may be moved from one location of the storage facility to another location in the storage facility by any of the robotic apparatus 101. The set of items may be of any size, shape, weight, and height. The item selection manager 808 may further create a queue of successive items from the set of items that are to undergo order consolidation. Further, the item selection manager 808 may be configured to provide the details of the selected item to the display device at any of the GTP system 200, the TTP system 300, and the manual operating station 400. The display device may be further configured to display the details of the selected item to aid a human operator or a robotic operator to initiate a transfer or loading on the selected item on a corresponding robotic apparatus that arrives at any of the first location, the second location, and the manual operating station 400.

The robotic apparatus manager 810 may include suitable logic, instructions, circuitry, interfaces, and/or code for selecting any of the robotic apparatus 101 to transport the item for order consolidation and packaging in the storage facility and controlling the operations of the selected robotic apparatus. The robotic apparatus manager 810 controls and communicates with any of the robotic apparatus 101 by way of instructions or signals. The robotic apparatus manager 810 further determines and communicates a path for any of the robotic apparatus 101 to traverse in the storage facility, estimating time period of arrival of any of the robotic apparatus 101 at the order consolidation station 116, a failure in operation of any of the robotic apparatus 101, corrective actions to correct the determined failure of operation, and the like.

The order consolidation manager 812 may include suitable logic, instructions, circuitry, interfaces, and/or code for controlling operations occurring at any of the order consolidation stations such as the order consolidation station 116. The order consolidation manager 812 may control operations of the order consolidation station 116 by way of data received from the control server 110. Examples of the operations that are controlled by the order consolidation manager 812 are detecting a side of arrival of any of the robotic apparatus at the order consolidation station 116, activating the first plurality of rollers R1 by rotating in a clockwise or anti-clockwise direction to transfer an item, deactivating the first plurality of rollers R1 based on the completion of the transfer of the item, comparing received item data with stored item data of the placed item to transfer the item, activating the roll-up and roll-down mechanism DU based on mismatch of height between the order consolidation station 116 and any of the robotic apparatus 101 arriving at the order consolidation station 116, detecting a failure in operation at the order consolidation station 116, implementing corrective actions to correct the determined failure at the order consolidation station 116 that may include re-routing any of the robotic apparatus 101 to another order consolidation station or another section of the order consolidation station 116, and the like.

The packaging manager 814 may include suitable logic, instructions, circuitry, interfaces, and/or code for controlling operations occurring at the packaging station 118. The operations occurring at the packaging station 118 are reception of items at the inbound conveying mechanism 602 at the packaging station 118 of the storage facility, auto-replenishing the totes for another order consolidation, and the like.

The memory 114 may include suitable logic, instructions, circuitry, and/or interfaces to store one or more instructions that are executed by entities such as the item selection manager 808, the robotic apparatus manager 810, the order consolidation manager 812, and the packaging manager 814 for performing one or more operations. Additionally, the memory 114 may be configured to store therein an inventory list 816, inventory storage data 818, layout information 820, robotic apparatus data 822, and order consolidation station data 824. Examples of the memory 114 may include a random access memory (RAM), a read only memory (ROM), a removable storage drive, a hard disk drive (HDD), a flash memory, a solid-state memory, and the like.

The inventory list 816 may include a list of items and packages stored in the storage facility and a number of units of each item stored in the storage facility. The inventory list 816 may include items and packages such as cold storage items that include soft drinks, fruit beverages, ice-creams, and the like. The inventory list 816 may further include items and packages such as toiletries, daily essentials, utensils, bags, grocery items, or the like.

The inventory storage data 818 is indicative of the storage locations of the items stored in the MSUs 108 and storage units present at any of the GTP system 200, the TTP system 300, and the manual operating station 400. The inventory storage data 818 may be indicative of associations between the items stored in the storage facility and the robotic apparatus 101 in the storage facility. The inventory storage data 818 may further include historic storage locations of each item. The inventory storage data 818 further includes parameters (for example, weight, shape, size, color, dimensions, or the like) associated with each item. Thus, based on the inventory storage data 818, the control server 110 is aware of the locations of all items stored in the storage facility.

The layout information 820 may include information regarding the layout of the storage facility, such as location data of the robotic apparatus 101, the first location, the second location, the manual operating station 400, the order consolidation area 500, the packaging area, or the like. The layout information 820 may further include reference markers of the robotic apparatus 101. The reference identifiers are unique codes assigned to each of the robotic apparatus 101. In one example, the reference markers are RFID tags that are readable by any of the robotic apparatus 101. The layout information 820 may be indicative of a current location of the robotic apparatus 101, entry and exit points of the storage facility, various reference markers in the storage facility, and current location of the robotic apparatus 101. The layout information 820 may further include real-time path availability information of various paths in the storage facility. For example, the first path in the storage facility may be under maintenance, and hence may be unavailable for traversing.

The robotic apparatus data 822 may include information regarding any of the robotic apparatus 101 present in the storage facility, such as the number of the robotic apparatus 101, an operation that is being carried out by each robotic apparatus, or the like. The robotic apparatus data 822 may further include real-time tracking of the operation being executed in various paths in the storage facility. For example, the fourth robotic apparatus 202a may be carrying the first item I1 to the order consolidation station 116.

The order consolidation station data 824 may include information regarding any of order consolidation stations such as the order consolidation station 116 present in the storage facility. The information may include a number of order consolidation stations, instructions for carrying out operations at the order consolidation stations, stored item data of items, sensor information of the plurality of sensors SS at each order consolidation station, or the like.

The transceiver 806 may include suitable logic, instructions, circuitry, and/or interfaces to transmit and receive data over the communication network 119 using one or more communication network protocols. The transceiver 806 may transmit various messages and commands to the item selection manager 808, the robotic apparatus manager 810, the order consolidation manager 812, and the packaging manager 814. The transceiver 806 may receive data from any of the robotic apparatus 101, the order consolidation station 116, and the packaging station 118. Examples of the transceiver 806 may include, but are not limited to, an antenna, a radio frequency transceiver, a wireless transceiver, a Bluetooth transceiver, an ethernet-based transceiver, a universal serial bus (USB) transceiver, or any other device configured to transmit and receive data.

Though the processing circuitry 112 is depicted as a hardware component in FIG. 8, a person skilled in the art will appreciate that the scope of the disclosure is not limited to realizing the processing circuitry 112 as the hardware component. In another embodiment, the functionality of the processing circuitry 112 may be implemented by way of a computer-executable code or a set of computer-readable instructions stored in the memory 114, without deviating from the scope of the disclosure.

FIGS. 9A-9E represent a flow chart 900 that illustrates an order consolidation method (i.e., a process) to facilitate order consolidation and packaging that is executed by the order consolidation system 100, in accordance with an exemplary embodiment of the present disclosure.

Figure 9A:
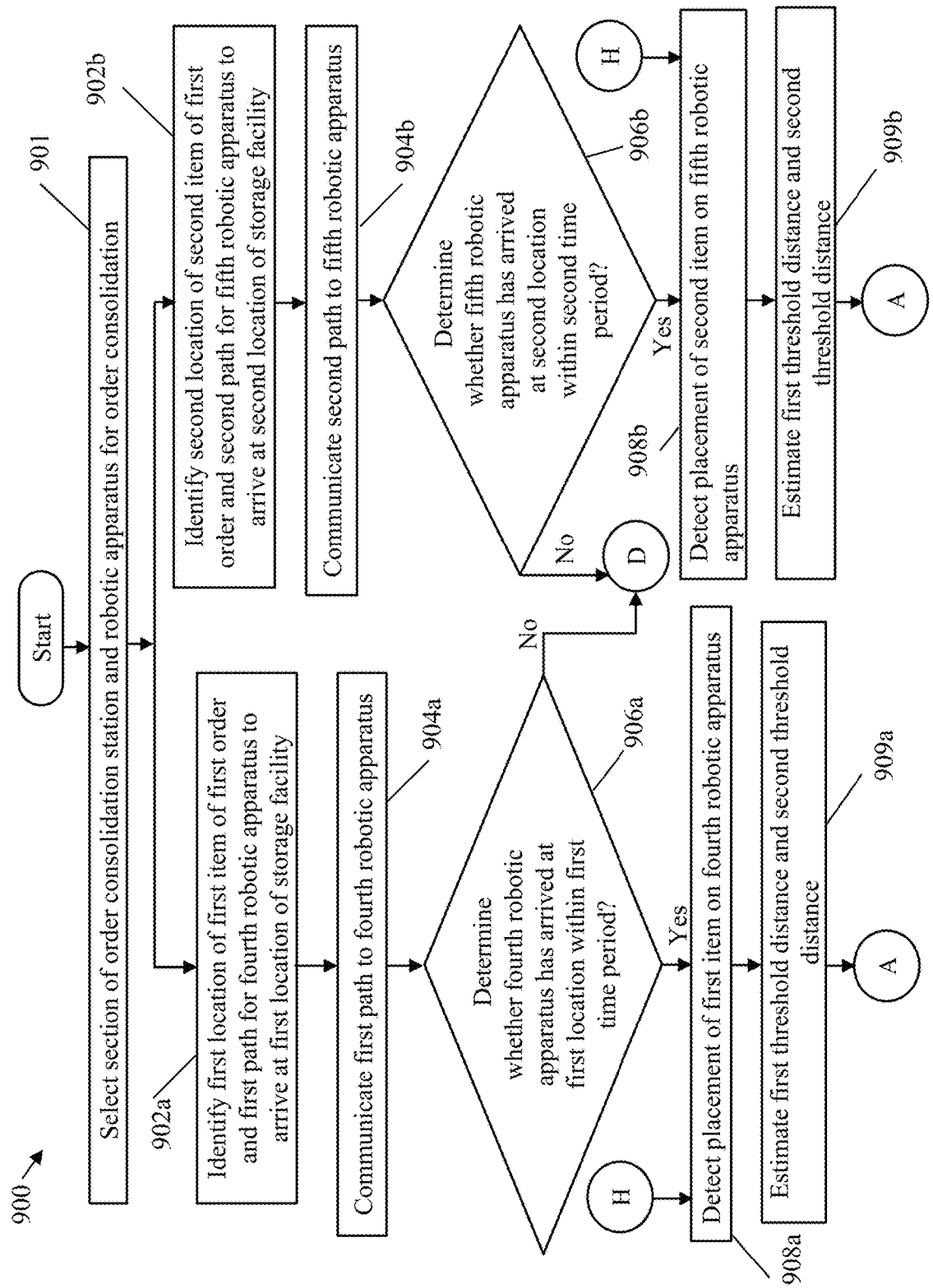
FIGS. 9A-9E represent a flowchart that illustrates an order consolidation method executed by the order consolidation system of FIG. 1A.

Referring now to FIG. 9A, at step 901, a section such as the first order consolidation section 503a of the order consolidation station 116 and any of the robotic apparatus 101 (such as the fourth robotic apparatus 202a and the fifth robotic apparatus 301) are selected for order consolidation. At steps 902a and 902b, the first location of the first item I1 of the first order to be consolidated and the first path of the fourth robotic apparatus 202a to arrive at the first location, and the second location of the second item I2 of the order to be consolidated and the second path of the fifth robotic apparatus 301 to arrive at the second location of the storage facility are identified by the control server 110, respectively.

At steps 904a and 904b, the first path is communicated to the fourth robotic apparatus 202a and the second path is communicated to the fifth robotic apparatus 301 by the control server 110, respectively. At steps 906a and 906b, it is determined by the control server 110, whether the fourth robotic apparatus 202a has arrived at the first location within the first time period and the fifth robotic apparatus 301 has arrived at the second location within the second time period, respectively. If at steps 906a and 906b, it is determined that the fourth robotic apparatus 202a has arrived at the first location within the first time period and the fifth robotic apparatus 301 has arrived at the second location within the second time period, steps 908a and 908b are executed, respectively. At steps 908a and 908b, the placement of the first item I1 on the fourth robotic apparatus 202a and the placement of the second item I2 on the fifth robotic apparatus 301 are detected by the control server 110. The control server 110 provides on the display system of the GTP system 200 and the TTP system 300, that the first item I1 and the second item I2 need to be placed on the fourth robotic apparatus 202a and the fifth robotic apparatus 301, respectively. At steps 909a and 909b, the first threshold distance and the second threshold distance are estimated by the control server 110.

Figure 9B:
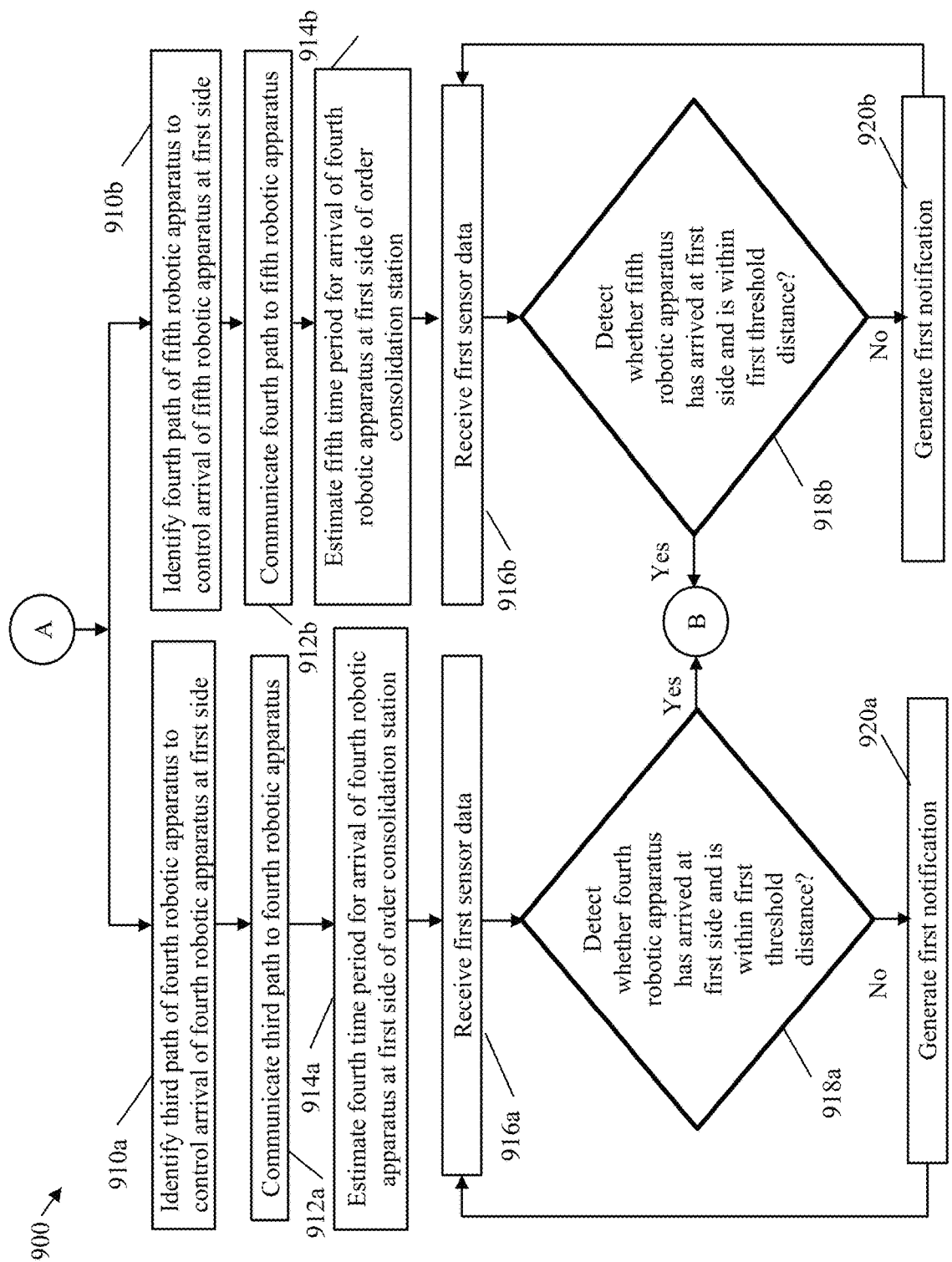

Referring now to FIG. 9B, at steps 910a and 910b, the third path of the fourth robotic apparatus 202a and the fourth path of the fifth robotic apparatus 301 are identified by the control server 110 to control the arrival of the fourth robotic apparatus and the fifth robotic apparatus 301 at the first side S1, respectively. At steps 912a and 912b, the third path is communicated to the fourth robotic apparatus 202a and the fourth path is communicated to the fifth robotic apparatus 301, respectively, by the control server 110. At steps 914a and 914b, the fourth time period for the arrival of the fourth robotic apparatus 202a at the first side S1 and the fifth time period for the arrival of the fifth robotic apparatus 301 at the first side S1 of the order consolidation station 116 are estimated, respectively, by the control server 110. At steps 916a and 916b, the first sensor data that indicates the presence of the robotic apparatus, i.e., the fourth robotic apparatus 202a and the fifth robotic apparatus 301, at the first side S1 and within the first threshold distance is received by the control server 110. At steps 918a and 918b, based on the first sensor data, it is detected by the control server 110, whether the fourth robotic apparatus 202a and the fifth robotic apparatus 301 have arrived at the first side S1 and are within the first threshold distance of the order consolidation station 116, respectively. The first sensor data may further indicate a distance of each of the fourth robotic apparatus 202a and the fifth robotic apparatus 301 from the first order consolidation section 503a. The control server 110 thus detects by comparing the received distance from the first threshold distance whether the fourth robotic apparatus 202a and the fifth robotic apparatus 301 are within the first threshold distance. If at steps 918a and 918b, it is detected that the fourth robotic apparatus 202a and the fifth robotic apparatus 301 have at least one of not arrived at the first side S1 and are not within the first threshold distance, steps 920a and 920b are executed, respectively. At steps 920a and 920b, a first notification is generated by the control server 110, such that at least one of the fourth robotic apparatus 202a arrives at the first side S1 and is within the first threshold distance and the fifth robotic apparatus 301 arrives at the first side S1 and is within the first threshold distance, respectively. If at steps 918a and 918b, it is detected that the fourth robotic apparatus 202a and the fifth robotic apparatus 301 have arrived at the first side S1 and are within the first threshold distance, respectively, step 922 is executed.

Figure 9C:
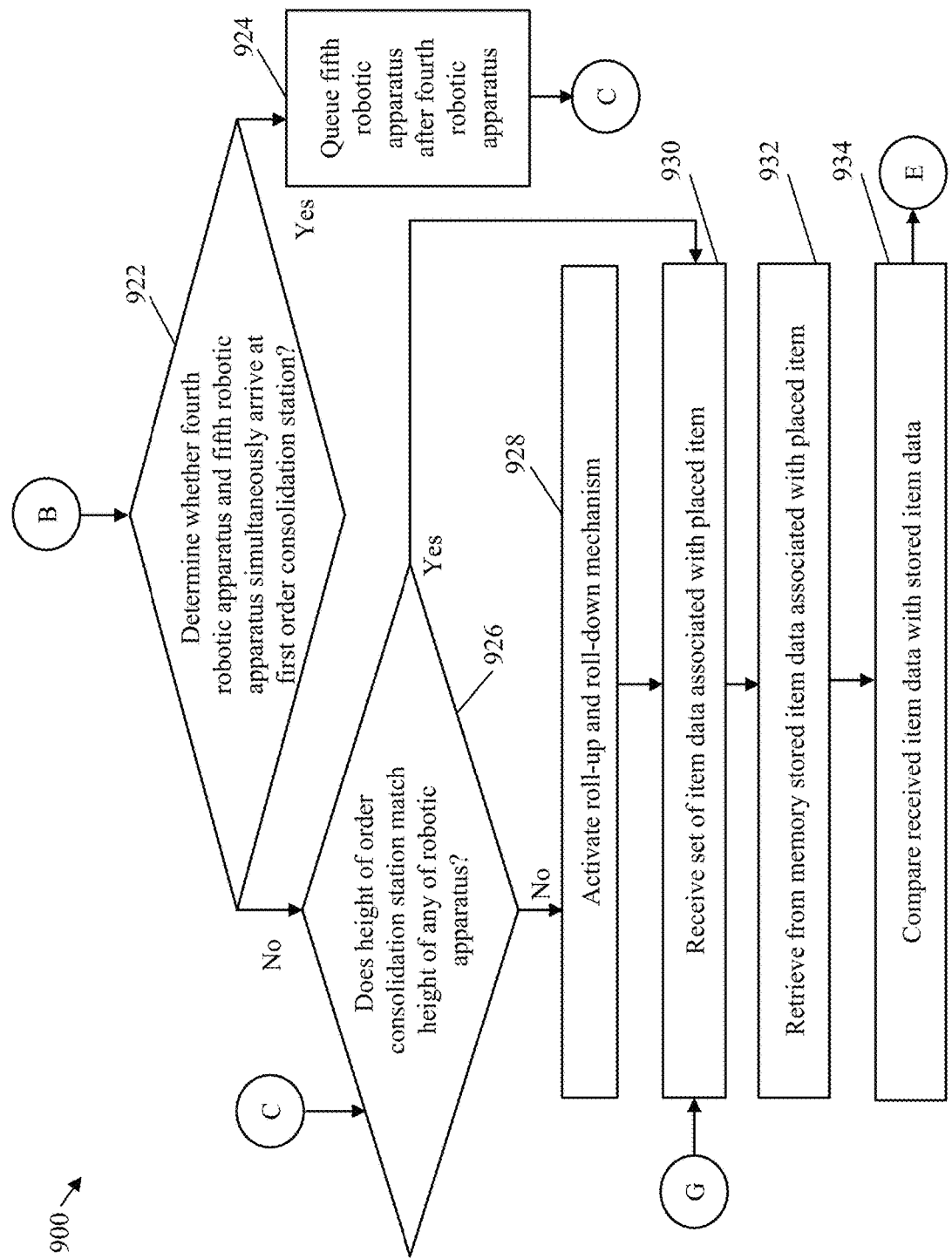

Referring now to FIG. 9C, at step 922, it is determined by the control server 110, whether the fourth robotic apparatus 202a and the fifth robotic apparatus 301 simultaneously arrive at the order consolidation station 116. If it is determined that the fourth robotic apparatus 202a and the fifth robotic apparatus 301 simultaneously arrive at the order consolidation station 116, step 924 is executed. At step 924, the fifth robotic apparatus 301 receives commands from the control server 110 to queue after the fourth robotic apparatus 202a. If at step 922, it is determined that the fourth robotic apparatus 202a and the fifth robotic apparatus 301 do not simultaneously arrive at the order consolidation station 116, i.e., the fourth robotic apparatus 202a arrives before the fifth robotic apparatus 301, step 926 is executed. At step 926, it is detected by the control server 110 by way of third sensor data received from the third set of sensors whether the height of the order consolidation station 116 matches the height of any of the robotic apparatus such as the fourth robotic apparatus 202a. If at step 926, it is detected that the height of the order consolidation station 116 does not match the height of the fourth robotic apparatus 202a, step 928 is executed. At step 928, the roll-up and roll-down mechanism DU is activated by the control server 110 to adjust the height of the order consolidation station 116 and match the height of the fourth robotic apparatus 202a. Once the height is adjusted, the robotic apparatus such as the fourth robotic apparatus 202a is configured to place the first item on the first plurality of rollers R1.

At step 930, the item data associated with the placed item, i.e., the first item I1, are received by the control server 110. The control server 110 is further configured to sense placement of an item such as the first item I1 on the first order consolidation section 503a by way of the load sensors of the order consolidation station 116. The item data associated with the placed item are sensed by the second set of sensors of the order consolidation station 116 based on instructions received from the control server 110. At step 932, the stored item data associated with the placed item, i.e., the first item I1, are retrieved from the memory 114 by the control server 110. At step 934, the received item data is compared with the stored item data associated with the first item I1 by the control server 110.

Figure 9D:
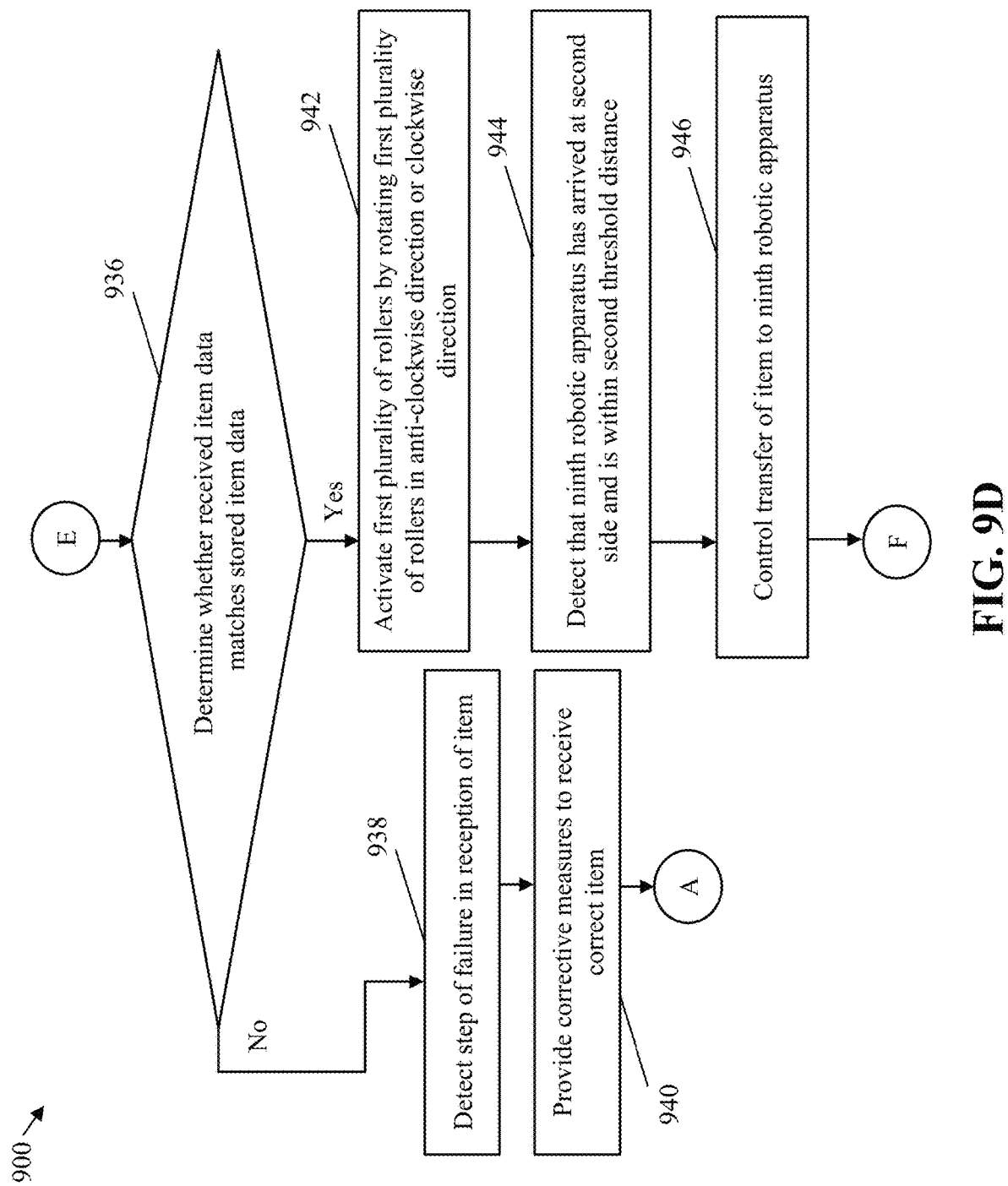

Referring now to FIG. 9D, at step 936, based on a result of comparison, it is determined by the control server 110 whether the received item data matches the stored item data associated with the first item I1. If it is determined that the received item of the first item I1 data does not match the stored item data associated with the first item I1, step 938 is executed. At step 938, a step of failure in reception of the first item I1 is detected by the control server 110. At step 940, corrective measures are generated and provided by the control server 110 such that the order consolidation station 116 receives the correct item such as the first item I1 and one of step 912a or 912b is executed.

At step 936, if it is determined that the received item data matches the stored item data associated with the first item I1, step 942 is executed. At step 942, the first plurality of rollers R1 are activated to receive the first item I1 by rotating the first plurality of rollers R1 in anti-clockwise direction or clockwise direction. At step 944, the ninth robotic apparatus 508 is detected by the control server 110 to have arrived at the second side S2 and within the second threshold distance of the first order consolidation section 503a based on the first sensor data. The first sensor data may indicate a distance of the ninth robotic apparatus 508 from the second side S2 of the first order consolidation section 503a. The control server 110 may thus compare the received distance of the ninth robotic apparatus 508 from the second side S2 with the second threshold distance to detect whether the ninth robotic apparatus 508 is within the second threshold distance. At step 946, the first item I1 is controlled to be transferred to the ninth robotic apparatus 508 by the control server 110.

Figure 9E:
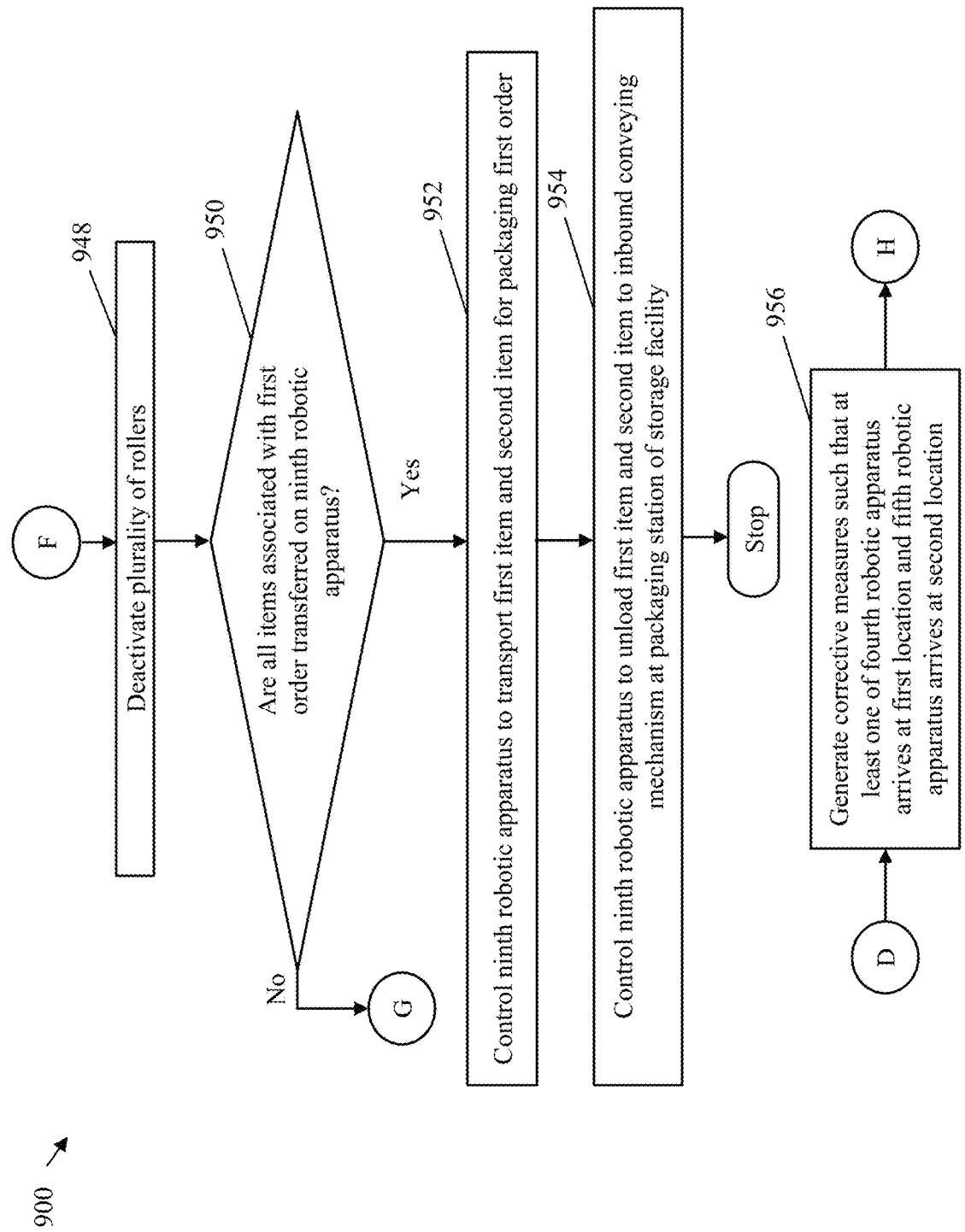

Referring now to FIG. 9E, at step 948, the first plurality of rollers R1 are deactivated by the control server 110 by way of the actuation mechanism. At step 950, it is determined by the control server 110 whether all items associated with the first order are transferred on the ninth robotic apparatus 508. If it is determined that all items associated with the first order are not transferred on the ninth robotic apparatus 508, steps 930-950 are executed. Thus, the second item I2 is transferred on the ninth robotic apparatus 508. At step 952, the ninth robotic apparatus 508 is controlled by the control server 110 to transport the first item I1 and the second item I2 for packaging the first order. At step 954, the ninth robotic apparatus 508 is controlled by the control server 110 to unload the first item I1 and the second item I2 to the inbound conveying mechanism 602 at the packaging station 118 of the storage facility. If at steps 906a and 906b, it is determined that the fourth robotic apparatus 202a and the fifth robotic apparatus 301 have not arrived at the first location within the first time period and the second location within the second time period, step 956 is executed. At step 956, corrective measures are generated by the control server 110 such that at least one of the fourth robotic apparatus 202a arrives at the first location and the fifth robotic apparatus 301 arrives at the second location. One of steps 908a and 908b is executed.

The disclosed embodiments encompass numerous advantages. Exemplary advantages of the order consolidation system 100 include, but are not limited to a system and method to facilitate order consolidation in a storage facility. The order consolidation system 100 offers a solution to consolidate multiple orders simultaneously at the same order consolidation station. As the disclosed system and method for order consolidation is automated by way of the control server 110 and operated based on instructions received from the control server 110, the precision of operation and consumption of time by the order consolidation station 116 improves over prior-art techniques that consolidate a single order one at a time and requires human operators to consolidate orders. The order consolidation system 100 does not require the same robotic apparatus to travel at multiple locations to fetch items associated with a single order, thereby further reducing the time of operation. In addition, the items that may be placed at different locations of the storage facility are transported by different robotic apparatus and hence easily consolidated at the order consolidation station 116 based on the instructions from the control server 110. The order consolidation system 100 thus provides an efficient solution for order consolidation and packaging by eliminating the likelihood of human error.

Figure 10:
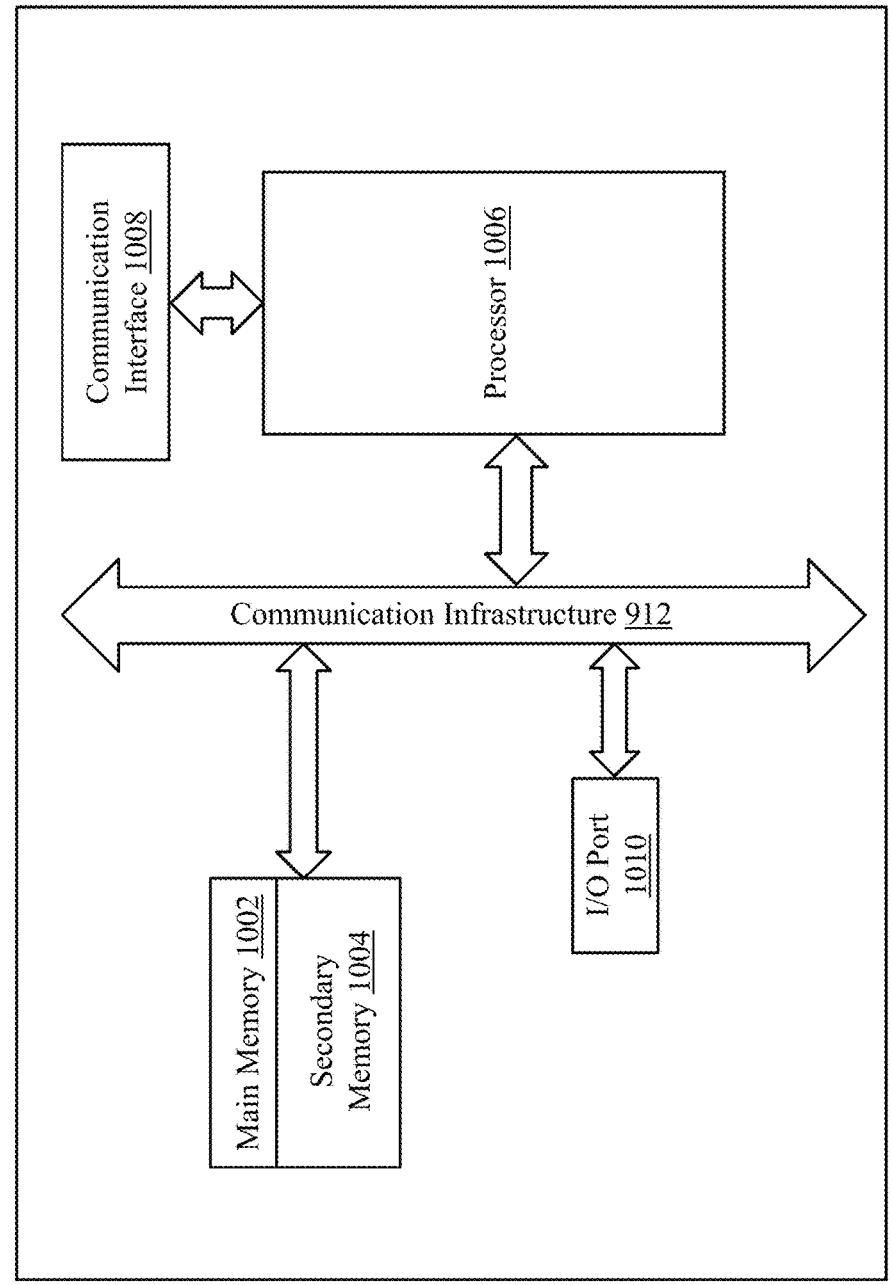
FIG. 10 is a block diagram that illustrates a system architecture of a computer system for order consolidation in the storage facility of FIG. 1A, in accordance with the embodiments of the present disclosure.

FIG. 10 is a block diagram that illustrates a system architecture of a computer system 1000 to facilitate order consolidation in the storage facility, in accordance with an exemplary embodiment of the present disclosure. An embodiment of the disclosure, or portions thereof, may be implemented as computer-readable code on the computer system 1000. In one example, the control server 110 of FIG. 1 may be implemented in the computer system 1000 using hardware, software, firmware, non-transitory computer-readable media having instructions stored thereon, or a combination thereof and may be implemented in one or more computer systems or other processing systems. Hardware, software, or any combination thereof may embody modules and components used to implement the methods of FIGS. 3 and 4. The computer system 1000 may include a main memory 1002, a secondary memory 1004, a processor 1006, a communication interface 1008, an input/output (I/O) port 1010, and a communication infrastructure 1012.

Examples of the main memory 1002 may include a random access memory (RAM), a read only memory (ROM), and the like. The secondary memory 1004 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage drive may be a non-transitory computer-readable recording media.

The processor 1006 may be a special purpose or a general-purpose processing device. The processor 1006 may be a single processor or multiple processors. The processor 1006 may have one or more processor "cores." Further, the processor 1006 may be coupled to the communication interface 1008 such as a bus, a bridge, a message queue, the communication network 119, multi-core message-passing scheme, or the like.

The I/O port 1010 may include various input and output devices that are configured to communicate with the processor 1006. Examples of the input devices may include a keyboard, a mouse, a joystick, a touchscreen, a microphone, and the like. Examples of the output devices may include a display screen, a speaker, headphones, and the like. The communication infrastructure 1012 may be configured to allow data to be transferred between the computer system 1000 and various devices that are communicatively coupled to the computer system 1000. Examples of the communication infrastructure 1012 may include a modem, a network interface, i.e., an Ethernet card, a communication port, and the like. Data transferred via the communication infrastructure 1012 may be signals, such as electronic, electromagnetic, optical, or other signals as will be apparent to a person skilled in the art. The signals may travel via a communications channel, such as the communication network 119, which may be configured to transmit the signals to the various devices that are communicatively coupled to the computer system 1000. Examples of the communication channel may include a wired, wireless, and/or optical medium such as cable, fiber optics, a phone line, a cellular phone link, a radio frequency link, and the like. The main memory 1002 and the secondary memory 1004 may refer to non-transitory computer-readable mediums that may provide data that enables the computer system 1000 to implement the method illustrated in FIGS. 9A-9E.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems and methods for automatic consolidation and packaging in the storage facility. While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure.

The invention claimed is:

1. An order consolidation system comprising:
a first robotic apparatus;
a second robotic apparatus;
a third robotic apparatus;
an order consolidation station that is equipped with a plurality of order consolidation sections, wherein a first order consolidation section of the plurality of order consolidation sections comprises a plurality of rollers; and
a control server configured to automatically:
estimate a first threshold distance from a first side of the first order consolidation section and a second threshold distance from a second side of the first order consolidation section;
detect that the first robotic apparatus and the second robotic apparatus have arrived at the first side of the first order consolidation section and are within the first threshold distance of the first order consolidation section;
receive item data associated with at least one of the first item and the second item based on the detection that the first robotic apparatus and the second robotic apparatus have arrived at the first side and are within the first threshold distance of the first order consolidation section, and a placement of at least one of the first item and the second item on the first order consolidation section, respectively;
determine a match between the received item data of the first item and the second item and stored item data associated with the first item and the second item, respectively;
activate, the plurality of rollers, based on the match between the received item data and the stored item data of each of the first item and the second item;
detect that the third robotic apparatus has arrived at the second side of the first order consolidation section and is within the second threshold distance of the first order consolidation section;
control, by way of the activated plurality of rollers, transfer of the first item and the second item to the third robotic apparatus based on the detection that the third robotic apparatus has arrived at the second side and is within the second threshold distance; and
control the third robotic apparatus to automatically transport the first item and the second item for packaging a first order that includes the first item and the second item.

2. The order consolidation system of claim 1, wherein the received item data and the stored item data associated with the first item and the second item includes at least one of a weight, a size, dimensions, and a type of the first item and the second item, respectively.

3. The order consolidation system of claim 1, wherein the first item and the second item are transferred in a tote that is placed on the plurality of rollers, and wherein the tote having the first item and the second item is transported for packaging the first order.

4. The order consolidation system of claim 1, wherein the order consolidation system is in a storage facility, and wherein the control server is further configured to:
identify a first path for the first robotic apparatus and a second path for the second robotic apparatus to arrive at a first location and a second location of the storage facility, respectively; and
communicate the first path to the first robotic apparatus and the second path to the second robotic apparatus, wherein the first item is placed on the first robotic apparatus based on the arrival of the first robotic apparatus at the first location and the second item is placed on the second robotic apparatus based on the arrival of the second robotic apparatus at the second location.

5. The order consolidation system of claim 4, wherein the control server is further configured to:
control the third robotic apparatus to unload the first item and the second item to an inbound conveying mechanism at a packaging station of the storage facility.

6. The order consolidation system of claim 1, wherein when the control server is further configured to:
estimate a first time period for the arrival of the first robotic apparatus at the first side of the first order consolidation section, a second time period for the second robotic apparatus to arrive at the first side of the first order consolidation section, and a third time period for the third robotic apparatus to arrive at the second side of the first order consolidation section to detect the arrival of the first robotic apparatus within the first time period, the second robotic apparatus within the second time period, and the third robotic apparatus within the third time period, respectively; and
generate a first notification for the order consolidation station based on the detection of at least one of non-arrival of the first robotic apparatus and the second robotic apparatus at the first side and the third robotic apparatus at the second side.

7. The order consolidation system of claim 1, wherein the control server is further configured to:
determine whether the first robotic apparatus and the second robotic apparatus simultaneously arrive at the first side of the first order consolidation section; and
queue the second robotic apparatus after the first robotic apparatus based on the determination that the first robotic apparatus and the second robotic apparatus simultaneously arrive at the order consolidation station.

8. The order consolidation system of claim 1, wherein the control server is further configured to:
deactivate the plurality of rollers when the first item and the second item are transferred to the third robotic apparatus.

9. The order consolidation system of claim 1, wherein the control server is further configured to rotate the plurality of rollers in an anti-clockwise direction or a clockwise direction.

10. The order consolidation system of claim 1, wherein a number of rollers in each order consolidation section of the order consolidation station is same or different.

11. The order consolidation system of claim 1, wherein the order consolidation station is equipped with a plurality of sensors.

12. The order consolidation system of claim 11, wherein the control server is further configured to receive first sensor data from the plurality of sensors, wherein based on the first sensor data, the control server determines that the first robotic apparatus and the second robotic apparatus have arrived at the first side and are within the first threshold distance of the first order consolidation section, and the third robotic apparatus has arrived at the second side and is within the second threshold distance of the first order consolidation section.

13. The order consolidation system of claim 11, wherein the received item data includes first received data and second received data associated with the first item and the second item, respectively, and the stored item data includes first stored data and second stored data associated with the first item and the second item, respectively.

14. The order consolidation system of claim 13, wherein the control server is further configured to:
retrieve from a memory associated with the control server, based on the item data received from the plurality of sensors, at least one of the first stored data and the second stored data; and
compare at least one of (i) the first stored data with the first received data, and (ii) the second stored data with the second received data to determine the match, respectively.

15. The order consolidation system of claim 1, wherein the control server is further configured to:
identify that a height of the order consolidation station mismatches a height of at least one of the first robotic apparatus, the second robotic apparatus, and the third robotic apparatus; and
activate, based on the identification of mismatch of the height of (i) at least one of the first robotic apparatus, the second robotic apparatus, and the third robotic apparatus and (ii) the order consolidation station, a roll-up and roll-down mechanism of the order consolidation station to at least one of (i) receive the first item from the first robotic apparatus, (ii) receive the second item from the second robotic apparatus, and (iii) transfer of the first item and the second item to the third robotic apparatus.

16. The order consolidation system of claim 1, wherein each order consolidation section is separated from other order consolidation sections of the plurality of order consolidation sections by a partition.

17. The order consolidation system of claim 1, wherein the control server is further configured to detect an operational failure of the first order consolidation section and re-route the first robotic apparatus, the second robotic apparatus, and the third robotic apparatus to another order consolidation section of the order consolidation station.

18. An order consolidation method comprising:
automatically estimating, by a control server, a first threshold distance from a first side of a first order consolidation section of an order consolidation station and a second threshold distance from a second side of the first order consolidation section;
automatically detecting, by the control server, that a first robotic apparatus and a second robotic apparatus have arrived at the first side of the first order consolidation section and are within the first threshold distance of the first order consolidation section;
automatically receiving, by the control server, based on the detection that the first robotic apparatus and the second robotic apparatus have arrived at the first side and are within the first threshold distance of the first order consolidation section and a placement of at least one of the first item and the second item on the first order consolidation section, item data associated with at least one of the first item and the second item;

automatically determining by the control server, a match between the received item data of the first item and the second item and stored item data associated with the first item and the second item, respectively;

automatically activating, by the control server, a plurality of rollers of the order consolidation station, based on the match between the received item data and the stored item data of each of the first item and the second item;

automatically detecting, by the control server, that a third robotic apparatus has arrived at the second side of the first order consolidation section and is within the second threshold distance of the first order consolidation section;

automatically controlling, by the control server by way of the activated plurality of rollers, transfer of the first item and the second item to the third robotic apparatus based on the detection that the third robotic apparatus has arrived at the second side and is within the second threshold distance; and automatically controlling, by the control server, the third robotic apparatus to automatically transport the first item and the second item for packaging a first order that includes the first item and the second item.

19. The order consolidation method of claim 18, further comprising:

identifying, by the control server, that a height of the order consolidation station mismatches a height of at least one of the first robotic apparatus, the second robotic apparatus, and the third robotic apparatus; and activating, by the control server, based on the identification of mismatch of the height of (i) at least one of the first robotic apparatus and the second robotic apparatus and (ii) the order consolidation station, a roll-up and roll-down mechanism of the order consolidation station.

20. The order consolidation method of claim 18, further comprising:

determining, by the control server, whether the first robotic apparatus and the second robotic apparatus simultaneously arrive at the first side of the first order consolidation section; and queuing, by the control server, the second robotic apparatus after the first robotic apparatus based on the determination that the first robotic apparatus and the second robotic apparatus simultaneously arrive at the order consolidation station.

* * * * *